United States Patent
Jerusalimsky

(10) Patent No.: US 11,663,311 B2
(45) Date of Patent: *May 30, 2023

(54) SECURITY MECHANISM FOR AN ELECTRONIC DEVICE

(71) Applicant: Comcast Cable Communications, LLC, Philadelphia, PA (US)

(72) Inventor: Dmitry Jerusalimsky, Union City, CA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 31 days.

This patent is subject to a terminal disclaimer.

(21) Appl. No.: 17/171,712

(22) Filed: Feb. 9, 2021

(65) Prior Publication Data
US 2022/0004615 A1    Jan. 6, 2022

Related U.S. Application Data

(63) Continuation of application No. 16/248,107, filed on Jan. 15, 2019, now Pat. No. 10,956,554, which is a continuation of application No. 15/437,645, filed on Feb. 21, 2017, now Pat. No. 10,216,918, which is a continuation of application No. 14/635,523, filed on Mar. 2, 2015, now Pat. No. 9,613,203.

(51) Int. Cl.
*G06F 21/36*   (2013.01)
*G06F 21/31*   (2013.01)

(52) U.S. Cl.
CPC ............ *G06F 21/36* (2013.01); *G06F 21/316* (2013.01)

(58) Field of Classification Search
None
See application file for complete search history.

(56) References Cited

U.S. PATENT DOCUMENTS

| 7,480,870 B2 | 1/2009 | Anzures et al. |
| 7,657,849 B2 | 2/2010 | Chaudhri et al. |
| 8,539,382 B2 | 9/2013 | Lyon et al. |

(Continued)

FOREIGN PATENT DOCUMENTS

WO    2013075434 A1    5/2013

OTHER PUBLICATIONS

"Unlock your device using random slider," dimaj.net, submitted Aug. 6, 2014, retrieved from <http://blog.dimaj.net/content/unlock-your-device-using-random-slider>, 7 pages.

(Continued)

*Primary Examiner* — Brandon Hoffman
(74) *Attorney, Agent, or Firm* — Banner & Witcoff, Ltd.

(57) ABSTRACT

According to some aspects, disclosed methods and systems may include determining, by an electronic device, a value associated with a first parameter configured to dynamically change, and displaying, via a user interface, an object corresponding to the value associated with the first parameter. The methods and systems may also include receiving, via the user interface, an input intended to unlock the electronic device, unlocking the electronic device if the received input interacts with the object in a predefined manner, and maintaining the electronic device in a locked state if the received input does not interact with the object in the predefined manner.

17 Claims, 11 Drawing Sheets

(56) References Cited

U.S. PATENT DOCUMENTS

| | | | |
|---|---|---|---|
| 8,924,893 B2 | 12/2014 | Swink et al. | |
| 9,513,790 B2* | 12/2016 | Liu | G06F 3/0488 |
| 2009/0160778 A1 | 6/2009 | Nurmi et al. | |
| 2012/0060123 A1 | 3/2012 | Smith | |
| 2013/0082974 A1 | 4/2013 | Kerr et al. | |
| 2013/0227450 A1* | 8/2013 | Na | G06F 3/048 |
| | | | 715/764 |
| 2013/0342491 A1 | 12/2013 | Liu et al. | |
| 2014/0009421 A1 | 1/2014 | Lee et al. | |
| 2014/0155031 A1 | 6/2014 | Lee et al. | |
| 2014/0272894 A1 | 9/2014 | Grimes et al. | |
| 2016/0077578 A1 | 3/2016 | Kuo | |

OTHER PUBLICATIONS

"AllanJH comments on What's the coolest thing you've done with Tasker?," retrieved Feb. 2, 2015 from <http://www.reddit.com/r/Android/comments/1immo6/whats_the_coolest_thing_youve_done_with_tasker/cb63mh4>, 4 pages.

Tunes, Ken Development, Math Alarm App Store, https://itunes.apple.com/us/app/math-alarm/id305800928?mt=8, pp. 1-2, retrieved May 19, 2016.

* cited by examiner

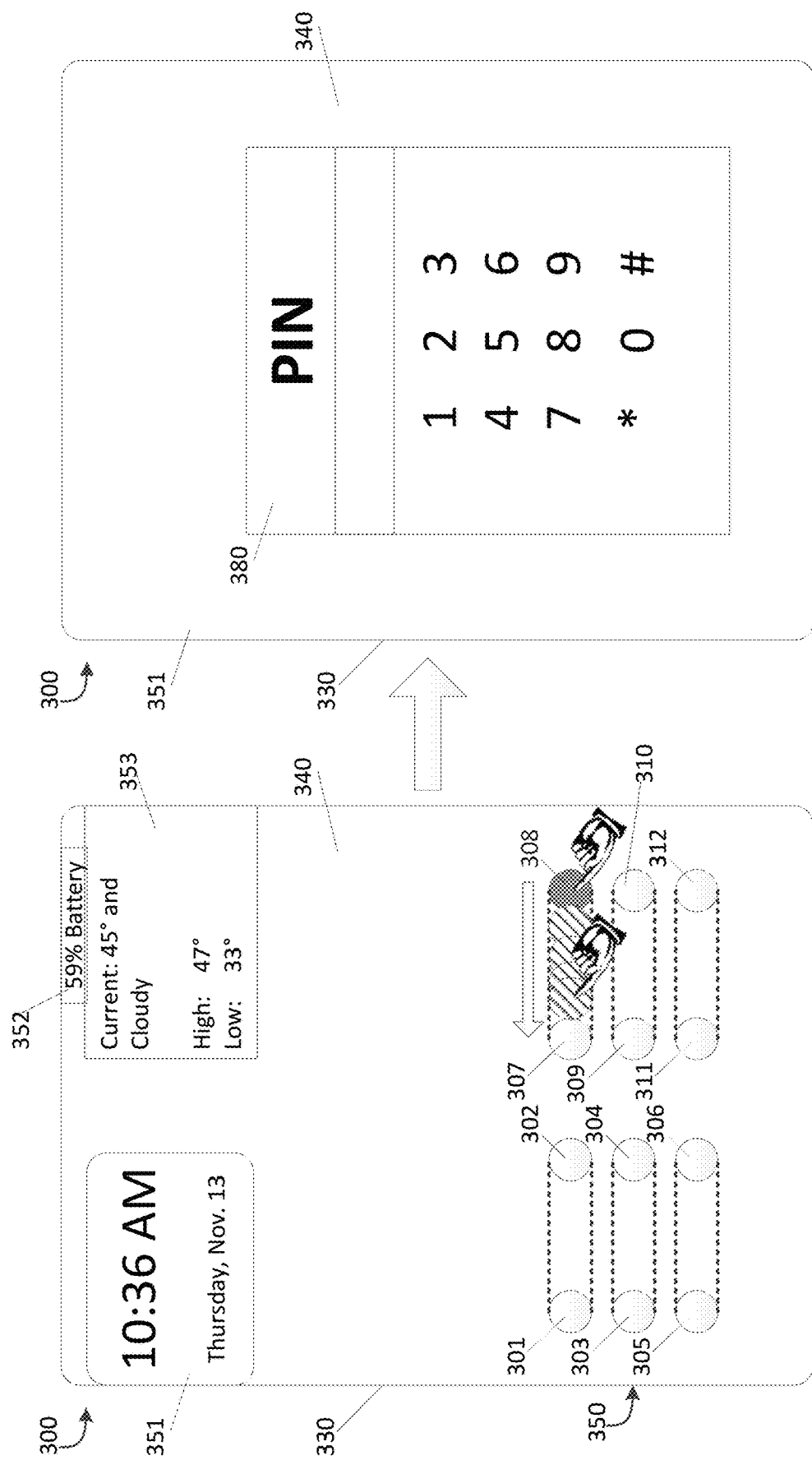

SECURITY MECHANISM FOR AN ELECTRONIC DEVICE

CROSS-REFERENCE TO RELATED APPLICATIONS

The present application claims priority to, and is a continuation of U.S. application Ser. No. 16/248,107, filed Jan. 15, 2019, now U.S. Pat. No. 10,956,554, which is a continuation of U.S. application Ser. No. 15/437,645, filed Feb. 21, 2017, now U.S. Pat. No. 10,216,918, which is a continuation of U.S. application Ser. No. 14/635,523, filed Mar. 2, 2015, now U.S. Pat. No. 9,613,203, all of which are hereby incorporated by reference as to their entirety.

BACKGROUND

Users of electronic devices have long sought a way to avoid cumbersome methods of locking and protecting their electronic devices. There is an ever-present need to secure an electronic device, while taking into consideration the convenience of a user.

SUMMARY

The following summary is for illustrative purposes only, and is not intended to limit or constrain the detailed description.

One or more aspects of the disclosure provide for a method for unlocking a locked electronic device that may include determining, by the electronic device, a value associated with a first parameter configured to dynamically change; and displaying, via a user-interface, an object corresponding to the value associated with the first parameter. The method may also include receiving, via the user-interface, an input intended to unlock the electronic device; unlocking the electronic device if the received input interacts with the object in a predefined manner; and maintaining the electronic device in a locked state if the received input does not interact with the object in the predefined manner.

One or more aspects of the disclosure also provide for a method for unlocking a locked electronic device that may include identifying, by the electronic device, a numerical value displayed on a display associated with the electronic device; generating, based on the numerical value, an input portion of a user interface configured in a locked state; and in response to receiving a gesture input configured to unlock the electronic device, transitioning the user interface from the locked state to an unlocked state.

One or more aspects of the disclosure also provide for a method unlocking a locked electronic device that may include receiving, by the electronic device, a first value associated with a first parameter and a second value associated with a second parameter; and determining a third value based on an association between the first parameter and the second parameter. The method may also include generating a user-interface on the electronic device based on the determined third value and a predetermined input method; unlocking the electronic device in response to the user-interface receiving a gesture input corresponding to the determined value and the predetermined input method; and maintaining the electronic device in a locked state in response to the user-interface not receiving a gesture input corresponding the determined value and the predetermined input method.

The summary here is not an exhaustive listing of the novel features described herein, and is not limiting of the claims. These and other features are described in greater detail below.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

FIGS. 6A and 6B illustrate examples of a computing device system in accordance with aspects of the present disclosure.

DETAILED DESCRIPTION

As will be appreciated by one of skill in the art upon reading the following disclosure, various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, removable storage media, solid state memory, RAM, magnetic storage devices, and/or any combination thereof. In addition, the functionality may be embodied in whole or in part in firmware or hardware equivalents, such as integrated circuits, field programmable gate arrays (FPGAs), and the like. Various signals representing data or events as described herein may be transferred between a source and a destination in the form of electromagnetic waves traveling through signal-conducting media such as metal wires, optical fibers, and/or wireless transmission media (e.g., air and/or space).

Figure 1:
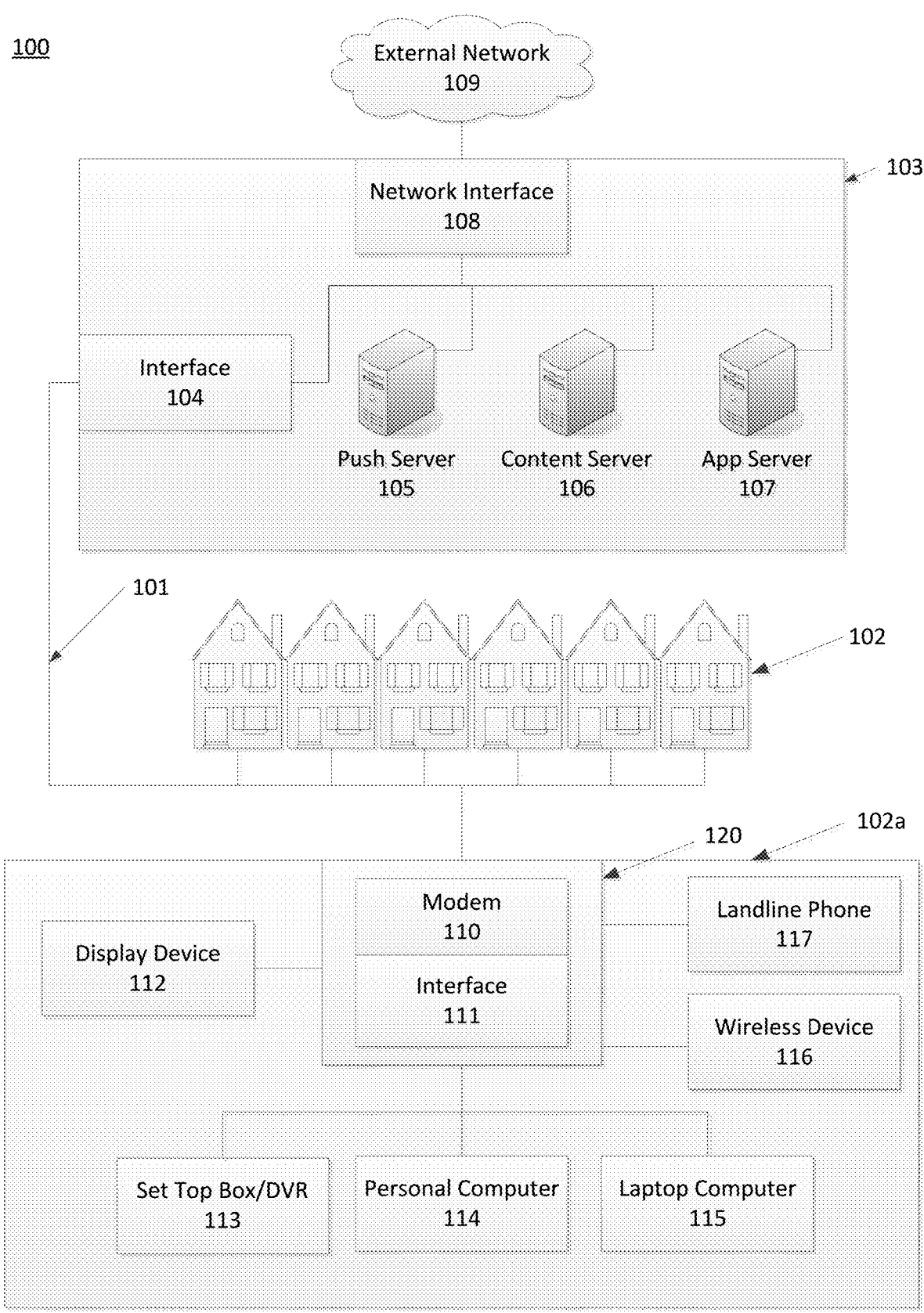
FIG. 1 illustrates an example communication network on which various features described herein may be used.

FIG. 1 illustrates an example communication network 100 on which many of the various features described herein may be implemented. The network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office or headend 103. The local office 103 may transmit downstream information signals onto the links 101, and each premises 102 may have a receiver used to receive and process those signals.

There may be one or more links 101 originating from the local office 103, and it may be split a number of times to distribute the signal to the various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths. By running fiber optic cable along some portions, for example, signal degradation may be significantly minimized, allowing a single the local office 103 to reach even farther with its network of the links 101 than before.

The local office 103 may include an interface 104, such as a termination system (TS). More specifically, the interface 104 may be a cable modem termination system (CMTS), which may be a computing device configured to manage communications between devices on the network of the links 101 and backend devices such as the servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include one or more push notification servers 105. The push notification server 105 may generate push notifications to deliver data and/or commands to the various premises 102 in the network (or more specifically, to the devices in the premises 102 that are configured to detect such notifications).

The local office 103 may also include one or more content servers 106. The content server 106 may be one or more computing devices that are configured to provide content to users at their premises. This content may be, for example, advertisements (such as commercials), video on demand movies, television programs, songs, text listings, etc. The content server 106 may include software to validate user identities and entitlements, to locate and retrieve requested content, to encrypt the content, and to initiate delivery (e.g., streaming or downloading) of the content to the requesting user(s) and/or device(s). The content server 106 may also be configured to generate advertising decisions and rules, and transmit them to a requesting user or device.

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. As another example, the application server or another server may be responsible for monitoring user viewing habits and collecting that information for use in selecting advertisements. As another example, the application server or another server may be responsible for formatting and inserting advertisements in, for example a video stream being transmitted to the premises 102. Yet in another example, the application server or another application server may be responsible for associating interactive components into and with content and/or advertisements. In addition, the application server or other server may transmit information, such as weather-related information, information related to sporting events, financial-related information, and the like. Although shown separately, one of ordinary skill in the art will appreciate that the push server 105, the content server 106, and the application server 107 may be combined. Further, here the push server 105, the content server 106, and the application server 107 are shown generally, and it will be understood that they may each contain memory storing computer executable instructions to cause a processor to perform steps described herein and/or memory for storing data.

An example premises 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local Wi-Fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111, such as a gateway, may be a computing device that communicates with the modem(s) 110 to allow one or more other devices in the premises 102a, to communicate with the local office 103 and other devices beyond the local office 103. The gateway interface device 111 may be a set-top box, digital video recorder (DVR), computer server, or any other desired computing device. The gateway interface device 111 may also include (not shown) local network interfaces to provide communication signals to requesting entities/devices in the premises 102*a*, such as the display devices 112 (e.g., televisions), the additional set-top boxes or the DVRs 113, the personal computers 114, the laptop computers 115, the wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), the landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

Figure 2:
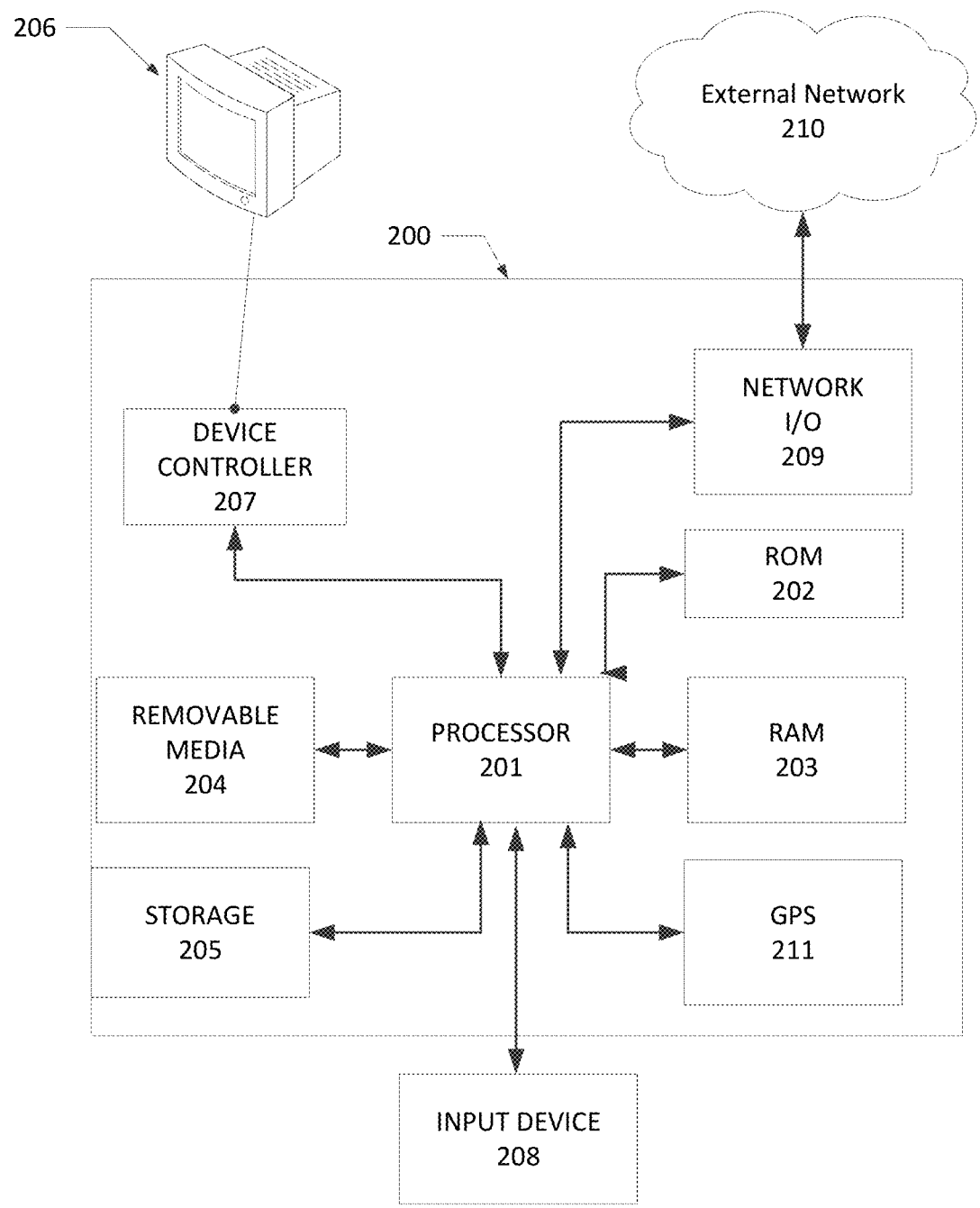
FIG. 2 illustrates an example computing device that can be used to implement any of the methods, servers, entities, and computing devices described herein.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, a random access memory (RAM) 203, a removable media 204, such as a Universal Serial Bus (USB) drive, compact disk (CD) or digital versatile disk (DVD), floppy disk drive, or any other desired storage medium. Instructions may also be stored in an attached (or internal) storage 205, such as a hard drive. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which can be configured to receive and process global positioning signals and determine, with possible assistance from an external server and antenna, a geographic position of the device.

FIG. 2 shows an example hardware configuration. Modifications may be made to add, remove, combine, divide, etc., components as desired, and some or all of the elements may be implemented using software. Additionally, the components illustrated may be implemented using basic display devices and components, and the same components (e.g., the processor 201, the ROM 202, the display 206, other input/output devices, etc.) may be used to implement any of the other display devices and components described herein. For example, the various components herein may be implemented using display devices having components such as a processor executing computer-executable instructions stored on a computer-readable medium (e.g., the storage 205), as illustrated in FIG. 2.

Figure 3:
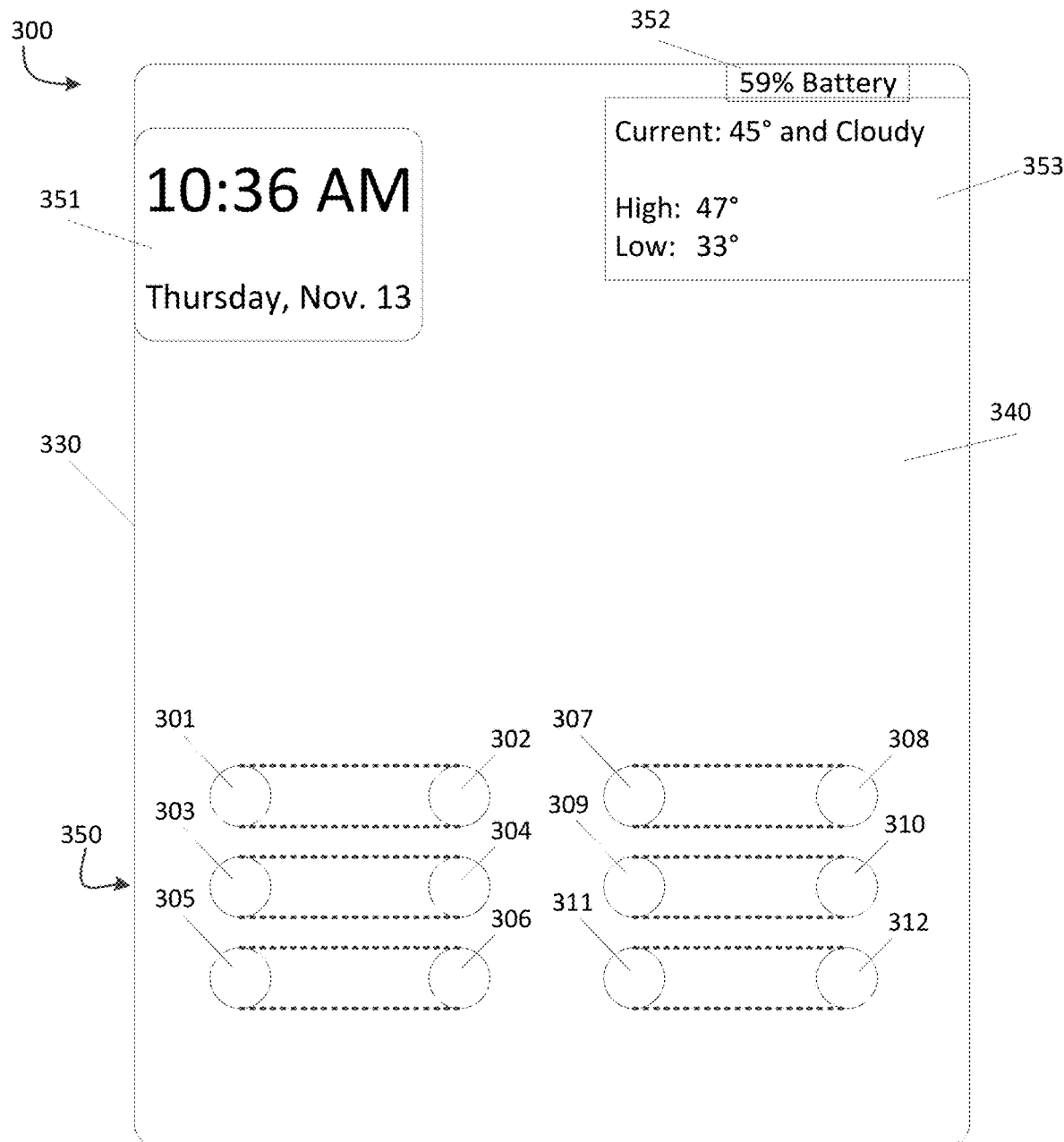
FIG. 3 illustrates an example computing device system in accordance with aspects of the present disclosure.

FIG. 3 illustrates a computing device 300 in accordance with one or more disclosed features described herein, which may comprise, may be substantially similar to, and/or may be the computing device 200, as shown in FIG. 2. The computing device 300 may comprise or otherwise be associated with a display 330, which may comprise, be substantially similar to, and/or be the display 206, as shown in FIG. 2. The display 330 may display, project, show or otherwise provide a user interface 340. The display 330 may be a touchscreen, touch display, holographic display, and the like. The computing device 300 may be, for example, a set-top box 113, personal computer 114, laptop computer 115, gateway 111, modem 110, display device 112, landline phone 117, wireless device 116, a mobile device (smartphone, tablet, smartwatch, Bluetooth, etc.), digital video recorder (DVR), personal digital assistance, digital video player, audio device, or any other device capable of providing or accessing media and/or content, or combinations thereof.

The user interface 340 may comprise one or more interface objects, which may include selectable and/or non-selectable objects. For example, the interface objects may comprise graphical elements, such as videos, images, or text, which may be selectable, configured to receive and detect input, or otherwise capable of interactivity, such as being capable of being selected or used to input commands (e.g., from a user). According to some aspects, the interface objects might not only comprise graphical elements, but may comprise one or more non-graphical elements, such as an interactive selectable blank portion (e.g., no visible image or overlay graphics) of the user interface 340. Thus, for example, a security application or mechanism (or associated object) may be selected or activated by touching a non-graphical object on the user interface 340 that may correspond to the security application. In addition, a security application or mechanism (or associated object) may be selected or activated by touching an image or graphical object on the user interface 340 that may correspond to the security application. These aspects will be described below in more detail.

The user interface 340 may include (e.g., display) one or more applications running, executing, or otherwise being provided by the computing device 300. As shown in FIG. 3, the interface 340 may include a time and date application 351, which may show the current time and date, a battery application 352, which may show how much power is left in a battery of the computing device 300 (e.g., percentage of battery remaining), and a weather application 353, which may show the current weather for a location (e.g., a current location of the device, a selected location, etc.). Information provided by one of these applications may be configured to fluctuate (e.g., dynamically change). For example, the weather at a given location may change or vary from minute to minute, hour to hour, day to day, etc. The weather application 353 may retrieve or determine weather updates via a weather source (e.g., a source internal to the computing device 300, a third-party source, the local office 103 or other entity, etc.) at fixed (e.g., periodically every 30 minutes) or at non-fixed/random times (e.g., whenever a user requests updated weather, whenever a data signal is available, etc.). Thus, the weather application 353 may determine and/or display one or more values (e.g., current temperature of 45 degrees, current forecasted high temperature of 47 degrees, etc.) of parameters that are configured to change, such as the high or low forecasted temperature, the current temperature, the current sky condition, and the like. In another example, the time and date may change over time, and thus the time and date application 351 may determine or retrieve a value for the time and date parameters from a time source (e.g., an internal source, a third-party source, the local office 103 or other entity, etc.). The time and date application 351 may then display (or might not display) the determined value of the time and date parameter (e.g., 10:36 AM, Thursday, November 13). In another example, the remaining battery power parameter may change whenever a battery of the computing device 300 is used or charged. Thus, the battery application 352 may determine (e.g., via an internal source, etc.) and/or display a value (e.g., 59%) of the battery power parameter.

The user interface 340 may include an input section 350, which may be used to detect or receive input, such as haptic and/or tactile contact (e.g., via a finger, etc.), input from an input device (e.g., mouse, stylus, etc.), other sensory input (e.g., via motion input, such as eye or hand movement, audio or voice input, etc.), and the like. As shown in FIG. 3, the input section 350 may be composed of input objects 301-312, which may be selectable and/or movable images (e.g., images of dots as shown in FIG. 3).

According to some aspects, the user interface 340 may be configured in a locked configuration, thereby preventing access to the contents of computing device 300 without unlocking (e.g., via a security mechanism) the computing device 300 and/or user interface 340. According to some aspects, a security application or mechanism may provide the locking capability of the computing device 300. The security application may be executing on the computing device 300 or may be remotely executing (e.g., via the local office 103 or other entity, etc.). According to some aspects, a user (or other entity) may input commands (e.g., via contact, an input device, etc.) via the input section 350 (or other portion) of the user interface 340. For example, the user interface 340 may comprise one or more movable or selectable user interface input objects configured for unlocking the computing device 300 via the security mechanism. As shown in FIG. 3, the objects 301-312 may be selectable and/or moveable, such that in response to a user selection and sliding of a correct one of the objects 301-312, the computing device 300 may unlock via the security mechanism. According to some aspects, the correct one of the objects 301-312 may be user defined, defined by an entity (e.g., such as the local office 103 or other entity), defined by the security application (e.g., via a computer algorithm), and/or the like. One example of a correct object may be the object 301, which may be configured to slide to the right. Thus, a user may unlock the computing device 300 by providing a slide input (e.g., via contact between the display 330 and a body part, via an input device, etc.) that may select and move the object 301 to the right. Other methods of configuring the security mechanism for locking/unlocking the computing device 300 may also be used, some of which will be described below in more detail.

Figure 4:
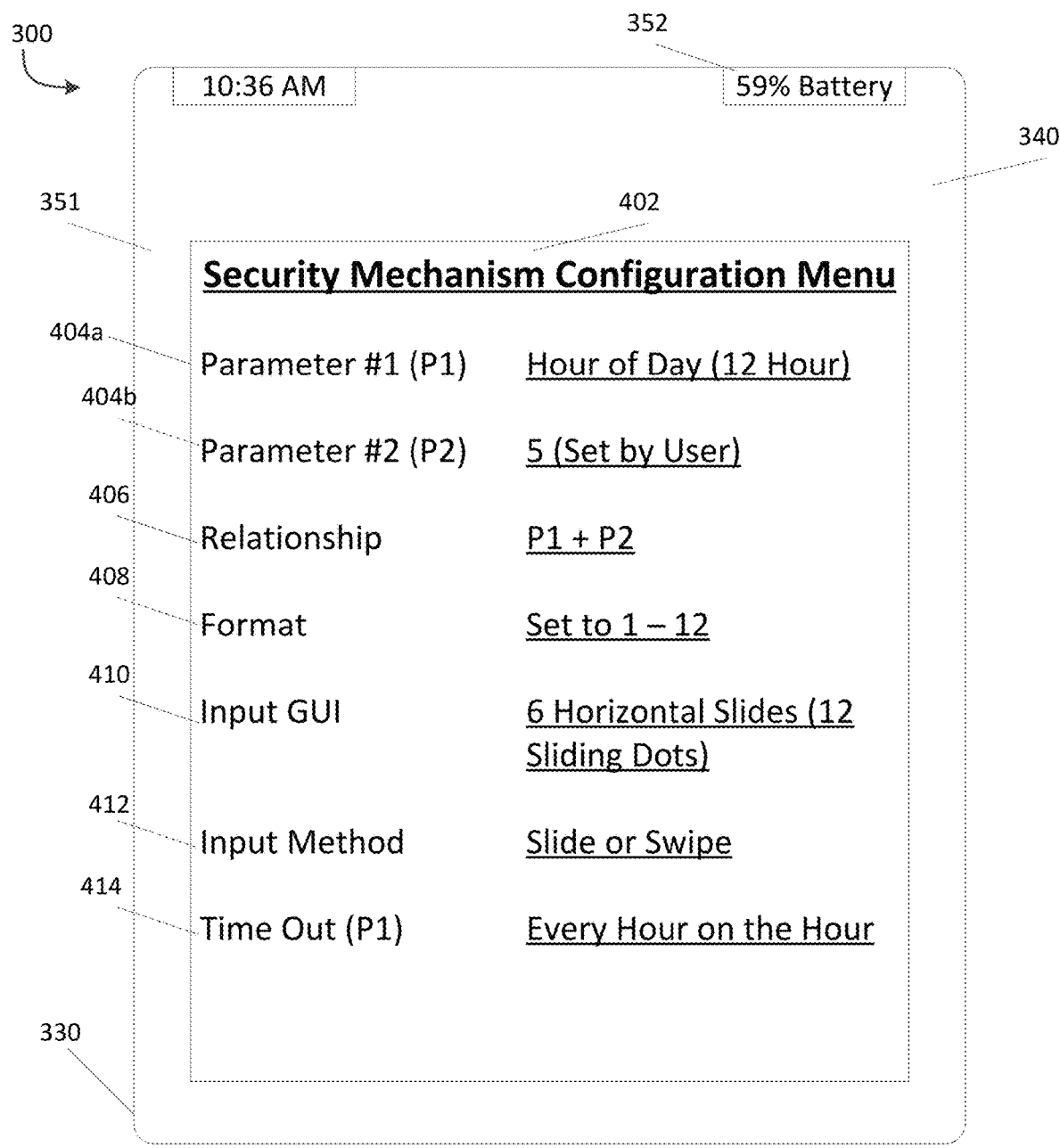
FIG. 4 illustrates an example computing device system in accordance with aspects of the present disclosure.

FIG. 4 illustrates the computing device 300 providing a security mechanism configuration or settings menu 402 in accordance with one or more disclosed features described herein. According to some aspects, the menu 402 (and information received via the menu 402 or other sources) may be used by the computing device 300 to set, define, or otherwise configure a locking mechanism for the computing device 300 in accordance with one or more disclosed aspects. According to some aspects, the locking mechanism may be configured in some other way besides the menu 402 (e.g., via computing code, via the local office 103 other entity, etc.). The menu 402 may include one or more fields 404-414 that may be capable of receiving one or more parameters, settings, or configurations, which may be received by the computing device 300 from an application, a user, the local office 103 or other entity, etc. The menu 402 may be displayed or otherwise provided via the display 330 of the computing device 300.

The menu 402 to receive settings/inputs (e.g., the fields 404-414) that may be used to configure a locking mechanism or application used by the computing device 300 (such as described above with respect to FIG. 2 and in further herein). The settings may define which parameters to base the locking mechanism (the fields 404a and 404b), one or more relationships between the parameters (the field 406), one or more formats for any of the parameters or any of the relationships between parameters (the field 408), one or more types of user interface input that may be used to unlock the computing device 300 (the field 410), one or more input methods that may be used to unlock the computing device 300 (the field 412), and/or one or more timeout values that may describe when a parameter or any of the relationships between parameters may timeout or expire (the field 414). According to some aspects, one or more of these settings/inputs might not be used in the configuration of the locking mechanism of the computing device 300, and other settings/inputs not explicitly shown in FIG. 4 may be used in the configuration of the locking mechanism of the computing device 300. The settings may be pre-defined, and may be selectable via a drop-down menu or be otherwise selectable in a pre-defined manner. According to some aspects, the settings might not be pre-defined, and may be input by a user in a non-predefined manner (e.g., via typing). According to some aspects, the settings may be configured/set via the local office 103 or other entity, or may be configured/set by a third-party application or source. According to some aspects, the settings may have a default setting, which may be set or received from an application, etc.

As shown in the example of FIG. 4, the field 404a may correspond to parameter #1 (P1), which is shown as configured with a setting of "Hour of Day (12 Hour)." Thus, in this example, the field 404a may correspond to the parameter of the current hour of the day in a twelve hour format. For example, a value for the field 404a may be determined by the computing device 300 (or other entity) to be 1, 2, 3, 4, 5, 6, 7, 8, 9, 10, 11, or 12, each of which correspond to an hour of the day in a twelve hour format. According to some aspects, the computing device 300 may receive information from an application (or some other source) that may correspond to the field 404a. For example, after the field 404a is defined with a particular parameter (e.g., Hour of Day) the computing device 300 may receive (or otherwise determine) a value for the current hour of the day from a time application, an internal source, the local office 103 or other entity, etc. According to some aspects, a timeout value for this parameter may be set for a parameter. For example, a timeout value for the hour of day parameter may be set to every hour on the hour (e.g., because the value for the current hour of the day may change every hour on the hour). According to some aspects, a parameter that may be input into any one of the parameters 404 of menu 402 may be a variable parameter that may be configured to change, such as change over time, periodically, randomly, change in response to some action (e.g., in response to the temperature rising, the battery power decreasing, etc.), etc. According to some aspects, a timeout value for a parameter may be determined based on how frequently a value of the parameter may change, how frequently a value of the parameter may be received by the computing device 300, how frequently the computing device 300 may determine the value of the parameter, or the like.

According to some aspects, a value of a parameter 404 may correspond to a value being displayed by the display 330, such as when the device is in a locked state, as shown in FIG. 3. For example, referring to FIG. 3, a value of a parameter 404 that may correspond to a value being displayed by the display 330 may be the time, day of the week, month, date, current temperature, high temperature, low temperature, sky condition, and/or battery power remaining. According to some aspects, if a user (or other entity) configures the computing device 300 to display a value of a parameter (e.g., the time) on the display 330 when the computing device 300 is in a locked state, then the menu 402 may include a setting for that corresponding parameter (e.g., the time parameter—hour of day parameter, minute of day parameter, first two digits of displayed clock, etc.).

According to some aspects, a parameter 404 (and the parameter 404's value) may correspond to any information known or retrievable/receivable by the computing device 300. For example, based on the information displayed on the display 330 in FIG. 3, a parameter 404 may be any of the following: a day of week (e.g., Monday=1, Tuesday=2, . . . , Sunday=7); a month (e.g., January=1, February=2, . . . , December=12); a temperature (e.g., past, present, predicted, etc.) at a current location or a specified location (e.g., as reported by a weather application or weather source such as The Weather Channel application or website, or other source); a Sunrise or Sunset time at a current location or a specified location, etc. According to some aspects, a parameter 404 may be based on any other information, such as an opening, current, closing, or specified date/time corresponding to price of a stock; a start or end time of a meeting in calendar; the number of emails (e.g., unread emails, unopened emails, total emails, emails in a specified folder, etc.); the number of steps taken by a user or other person in a time period (e.g., such as determined by and/or received from a fitness tracker application; etc.); a distance between a current or specified location to a specified location (e.g., such as reported by a mapping application, etc.); a time to drive, walk, or ride between a current or specific location to a specified location (as reported by Google maps, etc.); a car odometer reading (e.g., as reported by a odometer application, etc.); a score or statistic from a sporting event; etc.

Also shown in FIG. 4, the field 404b may correspond to a second parameter (e.g., parameter #2 (P2)), which may be configured with a setting of "5." According to some aspects, the field 404b (and/or any other field of the menu 402) may be a fixed parameter that may be user-defined or otherwise pre-defined (e.g., via the local office 103 or other entity, an application, etc.). For example, the user (or other entity or application) may input the number "5" into the field 404b. According to some aspects, a user (or other entity) may configure, input, and/or change this parameter at any time (e.g., such as when the menu 402 is display on the display 330, via programing code, etc.). The computing device 300 may determine a value associated with the second parameter based on this fixed value. For example, the computing device 300 may determine that a value for this parameter may be "5," which may correspond to the predefined value. According to some aspects, a fixed parameter might not be associated with a timeout value, and thus, might not expire in a similar manner as a variable parameter, such as after a predetermined time or event. While two parameters are illustrated in FIG. 4, any number of parameters (e.g., 1, 3, 6, etc.) may be used in accordance with aspects disclosed herein.

Field 406 may describe a relationship between the values of the parameter(s) determined from the parameter field(s) 404. The relationship may involve one or more of these parameter values. For example, the relationship may describe be a mathematical operation between the values of the parameters 404 (e.g., add, subtract, multiply, divide, exponentiation, remainder from division, fraction, negation, factorial, logarithm, square root, absolute value, trigonometric operations, etc.). The relationship may be a numeric comparison, such as equality, inequality, less than, less than or equal to, greater than, or greater than or equal to. The relationship may be a logical or Boolean operation (and, or, xor, xnor, not, nand, nor, etc.). The relationship may be any other relationship that may be implemented between one or more values. As shown in FIG. 4, the relationship may be configured as "P1+P2," which may describe adding the determined value of the parameter 1 of the field 404a to the determined value of the parameter 2 of the field 404b. According to some aspects, the value of the field 406 may be a numerical value that may result from the performance or execution of the identified relationship between parameters and their associated values.

Field 408 may describe a format for a value determined for any of the parameters 404 and/or a value of the relationship field 406. As shown in field 408, the format may be configured to be "Set to 1-12." According to some aspects, this format may correspond to the hours of a 12-hour clock cycle. For example, if the computing device 300 determines the value of the parameter 404a to be 12 (e.g., because the time may be 12:36 AM) and the value of the parameter 404b to be 5 (e.g., because the user pre-defined the value of parameter 404b to be 5), then the relationship of 12+5 may result in a value of 17. The formatted value of 17 using the format of "Set to 1-12," may result in a value of 5 (e.g., 17−12=5). In another example, if the value of the parameter 404a may be 7 (e.g., because the time may be 7:12 PM) and the value of the parameter 404b may be 5, then the relationship of 7+5 may result in a value of 12. The formatted value of 12 using the format of "Set to 1-12," may result in a value of 12. In another example, if the value of the parameter 404a may be 4 (e.g., because the time may be 4:16 PM) and the value of the parameter 404b may be 5, then the relationship of 4+5 may result in a value of 9. The formatted value of 9 using the format of "Set to 1-12," may result in a value of 9. Thus, any formatted value using the format "Set to 1-12" may result in a numerical value between 1-12. Other types of formatting (e.g., set to 1-10, etc.) may be used in accordance with aspects disclosed herein.

According to some aspects, an input format may be a default format. According to some aspects, a default format may be set or defined by an entity, such as the local office 103 or a user. According to some aspects, a default format may be set or defined based on an associated parameter or on the type of source that may transmit information associated with the parameter. For example, whenever the hour of day parameter may be input as a parameter 404, a default format may be set/implemented that may format the value of the relationship defined in field 406 to a number between 1-12. According to some aspects, the default format may be changed or configured to be another value. According to some aspects, there may be no default value set for the format. In such a situation, the format may be selected by the user (or other entity) or might not be selected or configured with a value (e.g., formatting might not be performed).

The field 410 may describe a type of user interface input that may be used to unlock the computing device 300. As shown in FIG. 4, the field 410 may be configured with "6 Horizontal Slides (12 Sliding Dots)." This setting may correspond to a configuration of the input section 350 as shown in FIG. 3. For example, referring to FIG. 3, the objects 301-312 may correspond to the 12 sliding dots, and the 6 horizontal slides may correspond to a sliding slot or plane for each pair of the objects 301-312 (e.g., one slide may correspond to the sliding slot or plane for objects 301 and 302, a second slide may correspond to the sliding slot or plane for objects 303 and 304, etc.). In other examples, there may be any number (e.g., different than 6) of objects comprised in the input section 350. For example, the user interface input may comprise one or more vertical sliding dots, squares, and/or other images that may correspond to one or more objects on the user interface 340.

The field 412 may describe a type of input method for a user interface that may be used to unlock the computing device 300. As shown in FIG. 4, the field 412 may be configured with "Slide or Swipe." This setting may correspond to a sliding input type (e.g., as described above) or swiping input type. For example, referring to FIG. 3, a user wishing to unlock the computing device 300 may swipe at or slide one or more of the objects 301-312. The input method may be any type of input method, such as sliding, moving, selecting, clicking, visual, audio, motion based, etc. For example, the user interface input may comprise sliding, moving, selecting, or clicking one or more graphical or non-graphical elements or objects, such as to another location on the user interface 340. In another example, a user may input a symbol on the user interface 340, such as making an "X" symbol by sliding a finger (or other input device) from the top left corner to the bottom right corner of the display 330, and then sliding a finger from the top right corner to the bottom left corner of the display 330. Other types of input methods may include rotating one or more graphical or non-graphical elements or objects (e.g., making a twirl, circle, etc.), rotating a graphical dial to a value or by a determined amount (e.g., rotate to the number 5 on a dial showing the numbers 1-12), entering a set of numbers or letters, and the like.

The field 414 may describe a timeout setting or value for a parameter 404 or any relationship 406 between parameters. A timeout value may inform the computing device 300 of an expiration of a value associated with a parameter 404. For example, a timeout value for parameter 404a may be set to every hour on the hour. In such a case, at every hour on the hour (e.g., at 10:00 AM, 11:00 AM, 12:00 PM, 1:00 PM, etc.), parameter 404a may expire or otherwise cause the computing device 300 to request, retrieve, or receive additional information for the parameter 404a to determine a corresponding value (e.g., the current vale may be refreshed with a new current value). With respect to FIG. 4, after a parameter 404 times out, other values of the fields shown in FIG. 4 may also change/update their corresponding values. For example, if the computing device 300 determines the value of the parameter 404a to be 12 (e.g., because the time may be 12:36 AM) and the value of the parameter 404b to be 5 (e.g., because the user pre-defined the value of parameter 404b to be 5), then the relationship of 12+5 may result in a value of 17. The formatted value of 17 using the format of "Set to 1-12," may result in a value of 5 (e.g., 17−12=5). At 1:00 AM, the current value of the timed out parameter 404a may expire, and the computing device 300 may receive, retrieve, or request additional information/data regarding the current time (e.g., from an internal source or other source like a time application or the local office 103, etc.). Based on this additional information, the value of the parameter 404a may change from "12" to "1." The value of the parameter 404b may stay "5," and the relationship of 1+5 may result in a value of 6. The formatted value of 6 using the format of "Set to 1-12," may result in a value of 6. According to some aspects a timeout value for a parameter may be determined based on how frequently a value of the parameter may change, how frequently a value of the parameter may be received by the computing device 300, how frequently the computing device 300 may determine the value of the parameter, or the like.

FIGS. 5, 6A, 6B, 7A, and 7B illustrate examples in accordance with disclosed aspects of unlocking a locked computing device 300, such as after the user interface 340 may have been configured in accordance with one or more settings, such as the settings shown on the menu 402 in FIG. 4.

Figure 5:
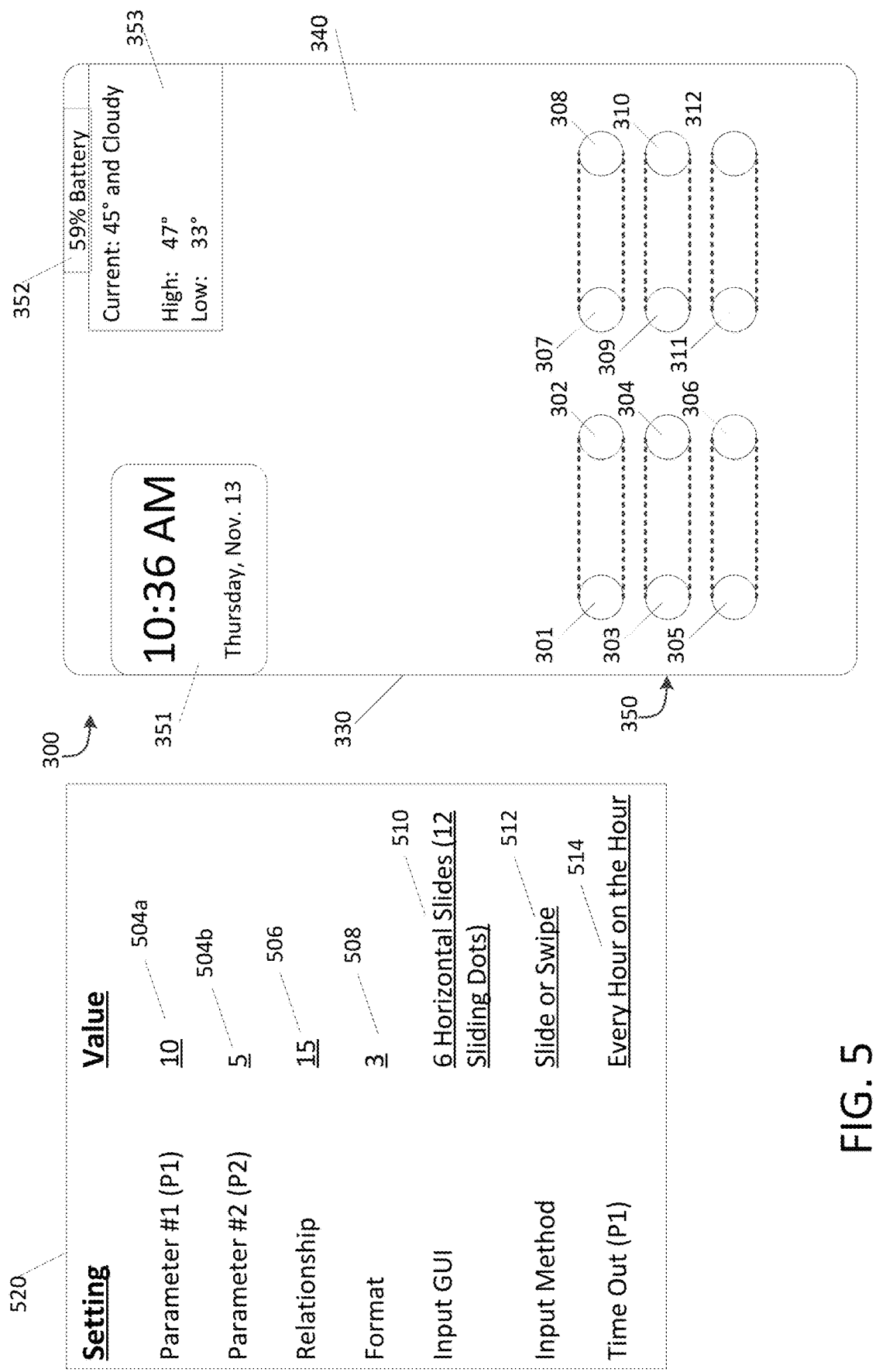
FIG. 5 illustrates an example chart of values and a computing device system in accordance with aspects of the present disclosure.

FIG. 5 illustrates the computing device 300 in a locked state having a display 330, which may display or show the user interface 340. The user interface 340 may include an input section 350 having the objects 301-312. The user interface 340 may also display the applications 351, 352, and 353. FIG. 5 also illustrates a chart 520 showing a value or result (e.g., determined by the computing device 300) for each field of the example menu 402 as shown in FIG. 4. For example, as shown in FIG. 4, the field 404a may correspond to a parameter #1 (P1) and may be configured with a setting of "Hour of Day (12 Hour Format)." Thus, the field 404a may correspond to the parameter of the current hour of the day in a twelve hour format. Because P1 may change or fluctuate over time or in response to an event or some action, P1 may be referred to as a variable parameter. Referring back to FIG. 5, the time and date application 351 may transmit and/or provide information regarding the current time and date to the computing device 300. The computing device 300 may display the current time and date (e.g., via the application 351) on the display 330 via the user interface 340. As shown in FIG. 5, the current time may be 10:36 AM. Based on this time-related information received by the computing device 300, the computing device 300 may determine that a current value for P1 may be "10," as shown by the element 504a in the chart 520. According to some aspects, a variable parameter might not be displayed or provided via the display 330. In such cases, the computing device 300 may still be able to determine a value for the variable parameter based on information received from a source or based on internal sources.

Referring to FIG. 4, the field 404b may correspond to parameter #2 (P2), which may be configured with a setting of "5." Because P2 might not fluctuate over time or in response to an action or event (e.g., besides being manually changed or set), P2 may be referred to as a fixed parameter. For example, a user (or other entity or application) may input (or otherwise transmit) the number "5" into the computing device 300 via the field 404b. Referring back to FIG. 5, the computing device 300 may retrieve or otherwise determine (e.g., via an internal source) that a value for P2 may be "5," as shown by the element 504b in the chart 520.

The computing device 300 may then determine an initial quantity or value as a result of a relationship between P1 and P2 as defined in the field 406 as shown in FIG. 4. As shown in FIG. 4, the relationship may be defined as the mathematical relationship of "P1+P2," which may describe adding the determined value of P1 to the determined value of P2. As shown in FIG. 5, the computing device 300 (or other entity) may determine or compute the initial value based on this mathematical relationship, which may result in a value of 15 (e.g., 5+10=15), as shown by the element 506 in the chart 520.

The computing device 300 may then determine a formatted value or quantity for the determined initial quantity or value as a result of the format defined in the field 408 as shown in FIG. 4. As shown in FIG. 4, the format may be defined as "Set to 1-12," which may describe formatting the determined initial value to a value between 1-12 (inclusive). As shown in FIG. 5, the device (or other entity) may determine or compute a formatted value based on the defined format, which may result in a value of 3 (e.g., take the remainder of dividing the determined initial value by 12 or compute "15-12"), as shown by the element 508 in the chart 520. For example, 15 divided by 12 equals "1" with a remainder of 3.

In another example, if the computed initial value may have been 28 (e.g., using some other values for P1 and P2), then using the 1-12 format, a formatted value for 28 may be 4 (e.g., the remainder of dividing 28 by 12). Another way to compute the formatted value for the initial value of 28 may be to compute "28−12−12=4." Therefore, the computing device 300 may determine that the formatted value may be "4" for a computed initial value of 28 using the 1-12 format.

The computing device 300 may then determine a type of user interface input that may be used to unlock the computing device 300. As shown in FIG. 4, the field 410 may be configured with "6 Horizontal Slides (12 Sliding Dots)." Referring to FIG. 5, this setting may correspond to the input section 350, which may include the objects 301-312 corresponding to one or more images of 12 sliding dots, and the 6 horizontal slides may correspond to a sliding slot or plane for each pair of the objects 301-312 (e.g., one slide may correspond to the sliding slot or plane for the objects 301 and 302, a second slide may correspond to the sliding slot or plane for the objects 302 and 304, etc.). This determined type of user interface may be shown as the element 510 in the chart 520. For example, object 301 may be configured to slide to the right of the display 330 in response to being contacted (e.g., by a finger, via an input device, etc.) and moved to the right within a visible or non-visible sliding slot or plane defined on the user interface 340 (shown by the dotted lines). In addition, object 302 may be configured to slide to the left of the display 330 in response to being contacted (e.g., by a finger, via an input device, etc.) and moved to the left within the same sliding slot or plane as object 301. The objects 303-312 may be configured in a similar manner.

The computing device 300 may then determine a type of input method that may be used to unlock the computing device 300. As shown in FIG. 4, the field 412 may be configured with "Slide or Swipe," which may correspond to a sliding input type or swiping input type. This may be shown by the element 512 in the chart 520. For example, referring to the computing device 300 in FIG. 5, this input method may correspond to a user, wishing to unlock the computing device 300, swiping at or sliding one or more of the objects 301-312, such as described above.

The computing device 300 may determine a timeout value for one of the parameters P1 or P2 or any value associated with the relationship between parameters. As shown in FIG. 4, the field 414 may be configured with a timeout value of "Every Hour on the Hour," which may describe the timeout value for the parameter 404*a*. Alternatively or additionally, the field 414 may be configured with a timeout value of "Every hour on the hour" for the value as defined by the relationship between the parameters (e.g., for a value associated with the field 406). Accordingly, at every hour on the hour, the determined value for P1 may expire. This may be shown by the element 514 in the chart 520. The computing device 300 may then request or receive additional information, such as information (e.g., information associated with the current time) the computing device 300 may use to determine a value for the expired value or for any other value.

As shown in FIG. 5, the computing device 300 may generate the user interface 340, such as the input portion 350, with a security or locking mechanism that may be based on the above information and/or settings. For example, based on the determined formatted value of "3," the computing device 300 (or other entity) may assign or configure one or more of the objects 301-312 as a "correct" object (e.g., the third object 303) that may be, when input in an acceptable or defined manner, configured to unlock the computing device 300. FIGS. 6A, 6B, 7A, and 7B illustrate examples of trying to unlock the computing device 300.

FIGS. 6A-6B illustrate examples of the computing device 300 receiving an incorrect input attempting unlocking the device (as configured with respect to FIGS. 4 and 5). Referring to FIG. 6A, a user (or other entity) may use a body party (e.g., a finger), other input device (e.g., a stylus, mouse, etc.), or other manner of input (e.g., visual, etc.) to input one of the objects 301-312 to try to unlock the computing device 300. For example, a first user might not know one or more of the parameters and/or settings used to configure the locking mechanism of the user interface 340 and the input section 350. The first user may have stolen the computing device 300, not be associated with the computing device 300, or otherwise not be authorized to use the computing device 300. The first user may try to access the contents of the computing device 300 and may try to unlock the device by inputting one of the objects 301-312. For example, the first user may try to unlock the device by using a finger to contact the display 330 at the object 308, and may try sliding the object 308 to the left by moving the finger to the left (shown in FIG. 6A with the hashed circles, finger, and arrow pointing to the left). This input may be incorrect, because the user interface 340 may be configured to unlock in response to the sliding or swiping of the object 303 to the right (e.g., based on the determined values as shown in the chart 520). Alternatively or additionally, if the input method is incorrect, then the computing device 300 also might not unlock. For example, the first user may tap one of the objects 301-312, which may be an incorrect input method, because the input method may be defined as a swipe or slide.

Accordingly, after the computing device 300 receives this incorrect input, the computing device 300 may request additional security information by configuring the user interface 340 in a different configuration, such as shown in FIG. 6B. As shown in FIG. 6B, the computing device 300 may display a user interface 340 having an input portion 380. The input portion 380 may be, for example, a keypad that may request a personal identification sequence or number as additional security information for unlocking the computing device 300.

According to some aspects, the input portion 380 requesting additional security information may be generated and/or configured in a similar manner (and/or with a different set of parameters) as the input portion 350 and the associated unlocking mechanism disclosed above and herein. For example, in response an unsuccessful attempt to unlock the computing device 300 using the input portion 350, the computing device 300 may display the input portion 350 configured with a security mechanism configured in the same or similar manner with a second set of parameters and values, which may be the same or similar parameters or values of the security mechanism configured for the initial unlocking attempt. The first user may then attempt to unlock the computing device 300 by inputting a correct object (e.g., in a correct input manner) based on the second set of parameters. According to some aspects, after correctly inputting this additional security information (or any other information requested by the computing device 300), the computing device 300 may unlock.

According to some aspects, after an initial (or subsequent) unsuccessful attempt to unlock the computing device 300, the computing device 300 may enter into a locked-out state. The locked-out state may require the first user to perform some addition action, such as contacting a service provider or other entity (e.g., which may be associated with providing network access to the computing device 300) to authenticate or validate that the first user is authorized to access the contents of the computing device 300. In response to a successful authentication, the service provider or other entity may unlock the computing device 300 (or otherwise allow the user access to the contents of the computing device 300). According to some aspects, the locked-out state may require the computing device 300 to wait for a period of time (e.g., 30 minutes, etc.) before allowing another attempt to unlock the computing device 300 (e.g., via the input portion 350). According to some aspects, the locked-out state may disable the computing device 300 or otherwise make the contents of the device inaccessible (e.g., via encryption, etc.).

Figures 7A, 7B:
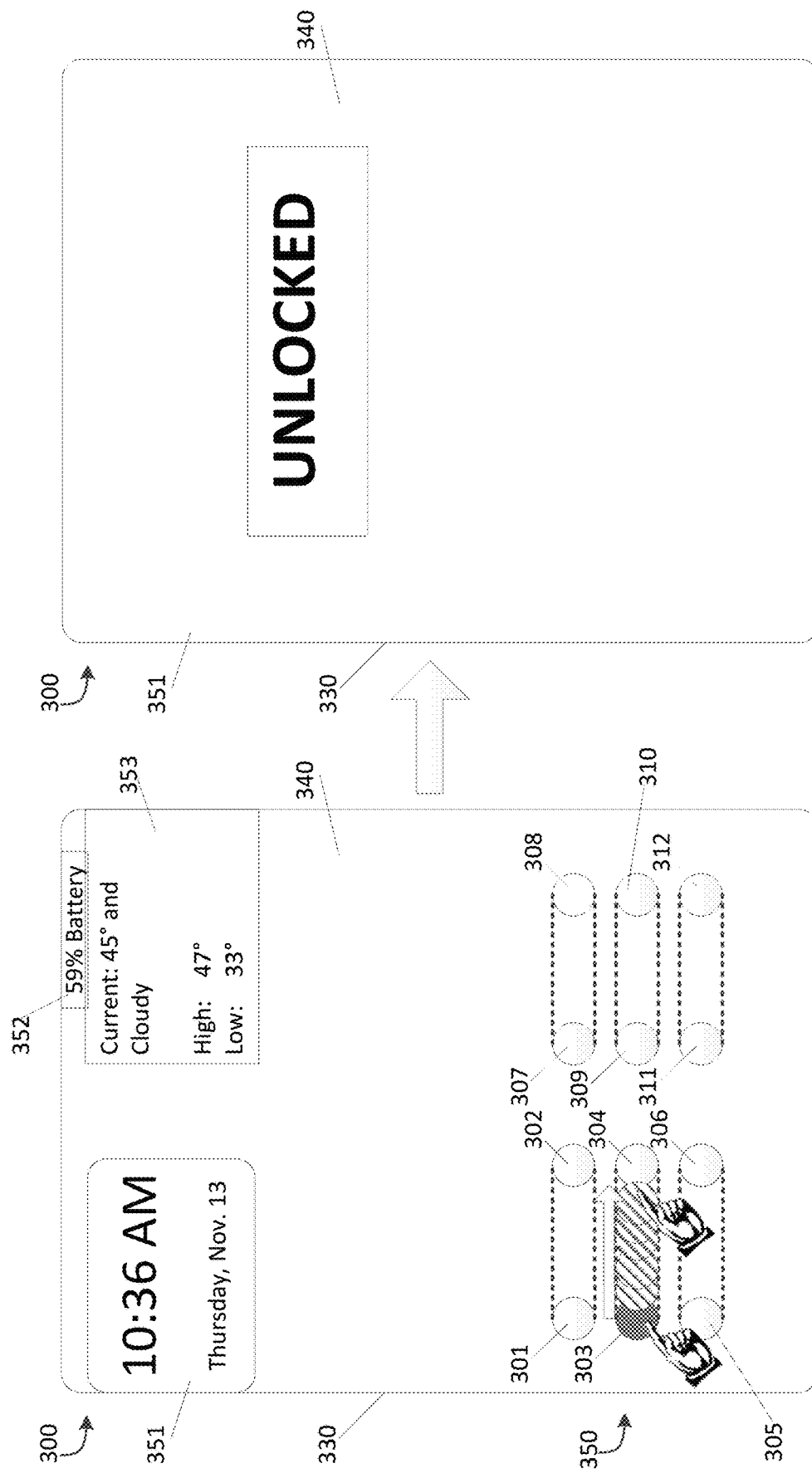
FIGS. 7A and 7B illustrate examples of a computing device system in accordance with aspects of the present disclosure.

FIGS. 7A-7B illustrate examples of the computing device 300 receiving a correct input attempting to unlock the computing device 300 (as configured with respect to FIGS. 4-5). Referring to FIG. 7A, a user (or other entity) may use a body party (e.g., a finger), other input device (e.g., a stylus, mouse, etc.), or other manner of input (e.g., visual, etc.) to input one of the objects 301-312 to try to unlock the computing device 300. For example, a second user may know the parameters and settings used to configure the locking mechanism of the user interface 340 and the input section 350 (e.g., because the second user may have set one or more of the settings or parameters via the menu 402, via computing code, or some other way). Based on the knowledge of these parameters and settings, the second user may be able to determine the correct way to unlock the computing device 300. For example, as shown in FIG. 7A, the time may be displayed to be 10:36 AM. Based on the current time, the second user may then determine (e.g., by viewing the current time on the screen, or otherwise determining the current time) that the value for P1 may be "10." The second user may also know that the value for P2 may be set to "5" (e.g., the second user may have set this value or otherwise know the value). The second user may know the defined relationship, format, a type of user interface input, type of input method, and the timeout parameter or value. Based on these parameters and settings, the second user may try to unlock the device by using a finger to contact the display 330 and sliding the object 303 to the right by moving the finger to the right (as shown in FIG. 7A by the hashed circles, finger, and the arrow pointing to the right). This input may be correct, because the user interface 340 may be configured to unlock in response to the sliding or swiping of the object 303 to the right. In response to a successful attempt to unlock the computing device 300, the computing device 300 may transition to an unlocked state, as shown in FIG. 7B, in which the second user may access the contents of the computing device 300.

Figure 8:
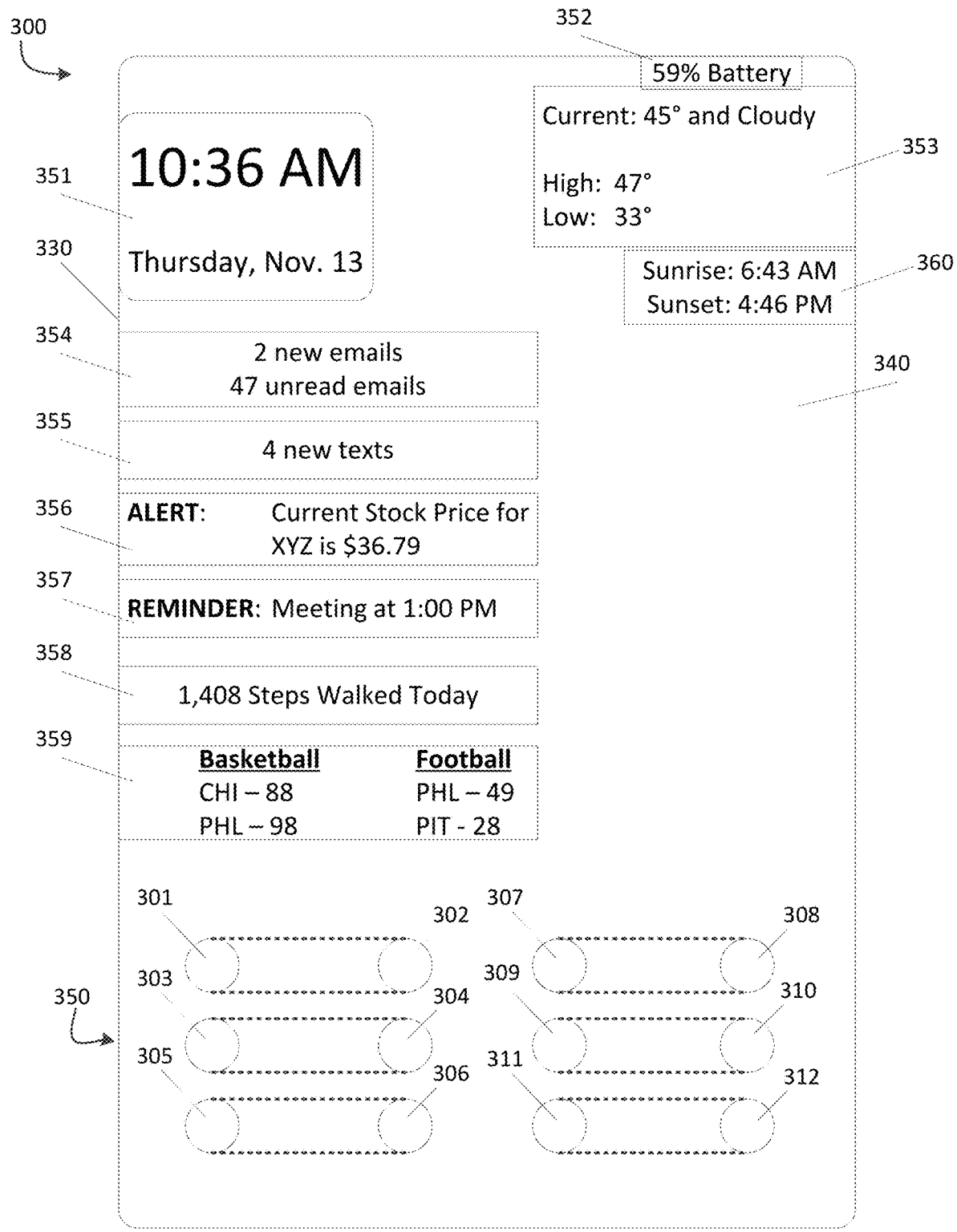
FIG. 8 illustrates an example computing device system in accordance with aspects of the present disclosure.

FIG. 8 illustrates the computing device 300 displaying or providing examples of various information and data that may be used in accordance with one or more disclosed aspects. The computing device may display on the display 330 (e.g., via the interface 340) one or more applications (some of which may be third-party applications) and information provided by those applications and/or received by the computing device 300. According to some aspects, the computing device 300 shown in FIG. 8 may be in a locked state and may be configured with a locking mechanism (e.g., which may configure the input section 350) using one or more pieces of information that may be displayed via the display 330. For example, as discussed above, the interface 340 may include a time and date application 351, which may show the current time and date, a battery application 352, which may show the percentage of battery remaining in a battery coupled to the computing device 300, and a weather application 353, which may show weather related information. In addition, the interface 340 may also include an email application 354 (e.g., that may indicate the number of unread emails, unopened emails, total emails, emails in a specified folder, etc.), a text messaging application 355 (e.g., that may indicate the number of new texts received, number of total texts, etc.), a finance application 356 (e.g., that may indicate banking information, financial information, stock market information), a scheduling application 357 (e.g., that may indicate meeting dates, upcoming meeting times and dates, etc.), a fitness application 358 (e.g., that may indicate fitness related information, number of steps taken, distance walked, etc.), a sports application 359 (e.g., that may indicate scores from sporting events, such as from a favorite team's sporting event), and a sunrise/sunset application (e.g., that may indicate sunrise, sunset, etc. for a provided or current location).

According to some aspects, one or more parameters associated with the applications 351-360 may be variable parameters, such that the one or more of the numerical values displayed on display 330 in FIG. 8 may fluctuate or change based on an event and/or based on time. For example, the amount of step displayed on the display 330 may increase from 1,408 to 1,409 in response to the user taking a step, the application 358 detecting that step, the application 358 increasing a number of steps walked by one, and the application 358 transmitting or providing the updated number of steps to the computing device 300. In another example, the sunrise and/or sunset times may change each day.

Figure 9:
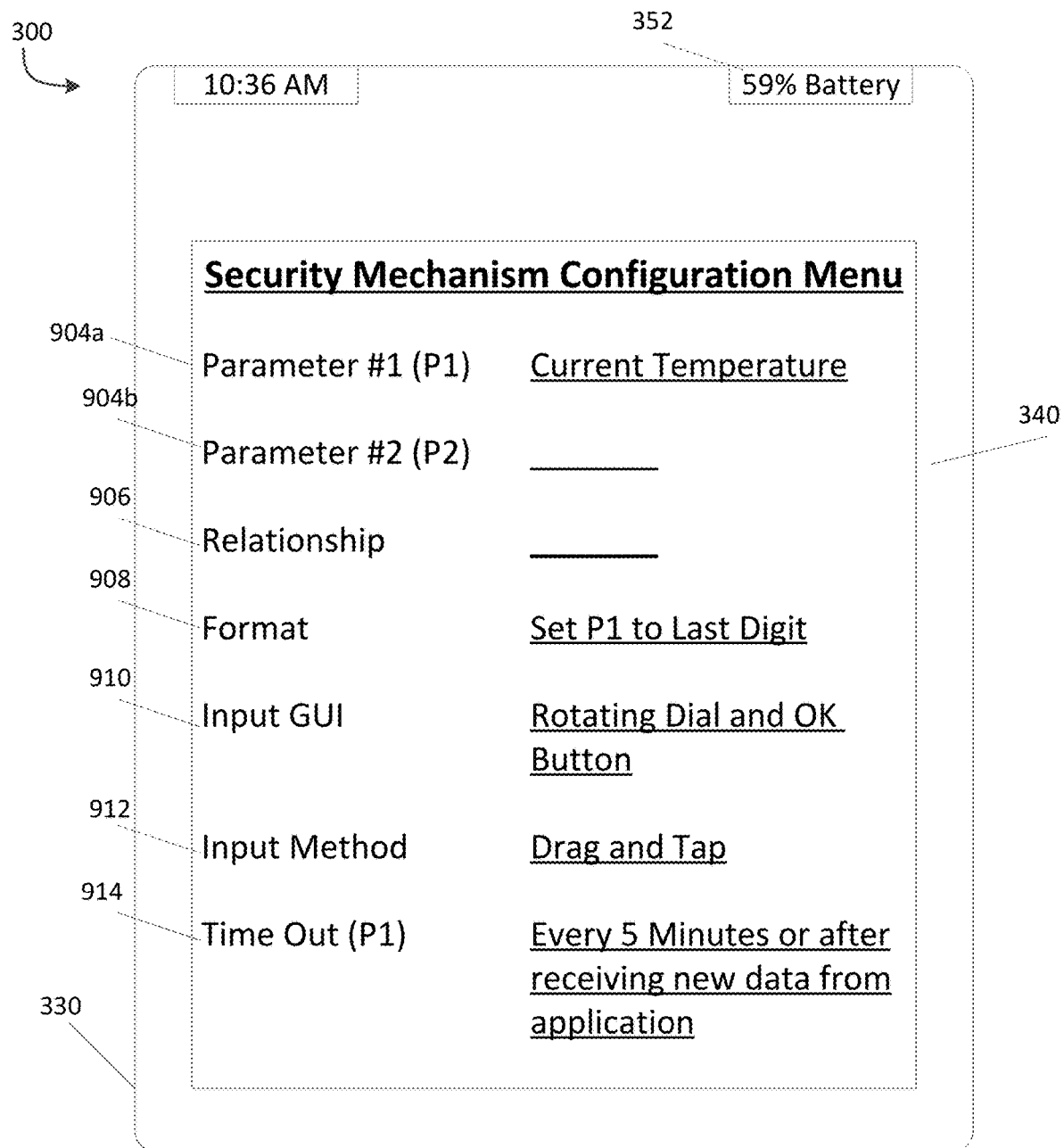
FIG. 9 illustrates an example computing device system in accordance with aspects of the present disclosure.
Figure 10:
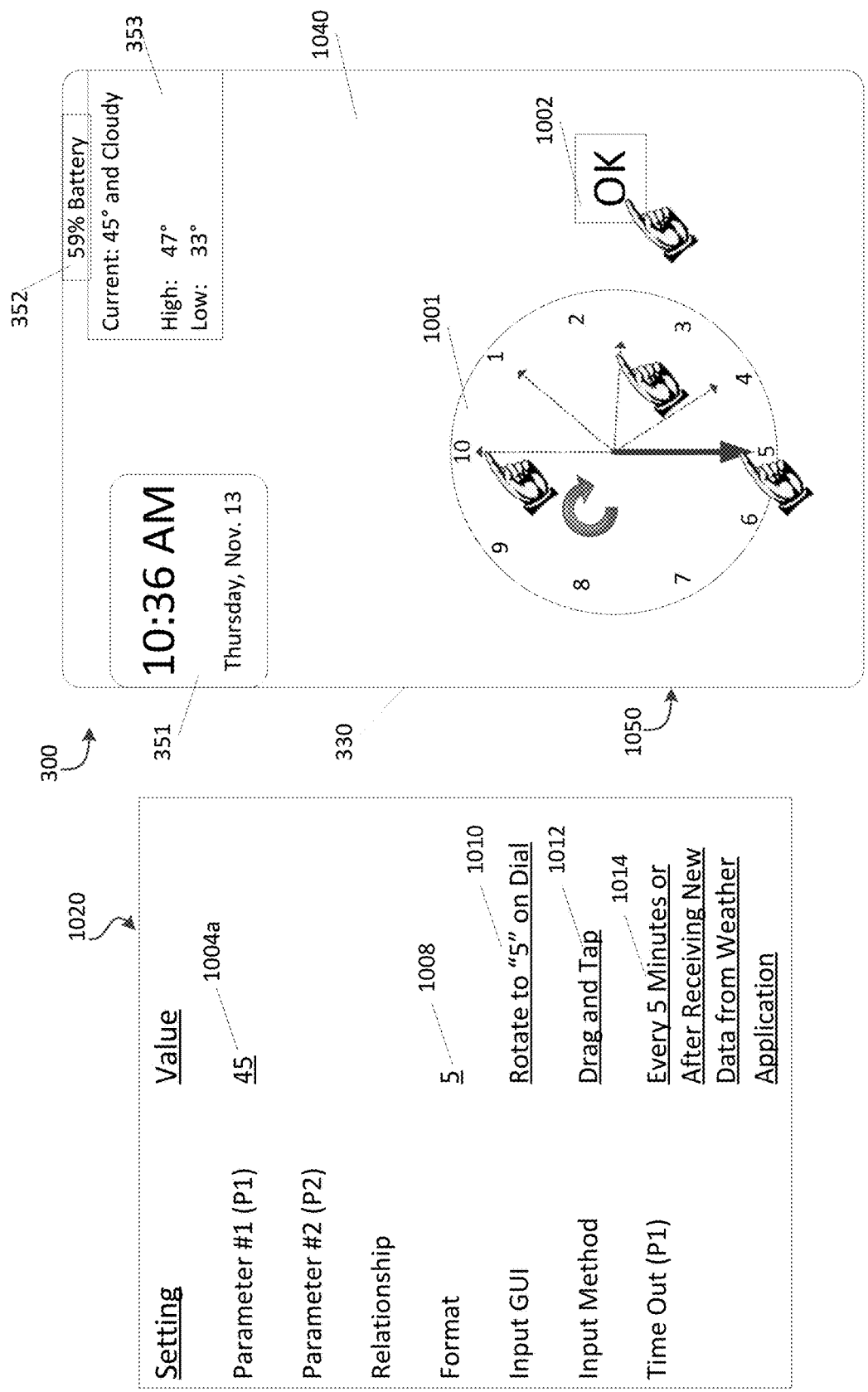
FIG. 10 illustrates an example chart of values and a computing device system in accordance with aspects of the present disclosure.

FIGS. 9 and 10 illustrate examples of configuring the computing device 300 with an example of a security mechanism and user interface, and attempting to unlock the computing device 300 based on the configuration. FIG. 9 illustrates the computing device 300 providing a security mechanism configuration or settings menu 902 in accordance with one or more disclosed features described herein. The menu 902 may the same or substantially similar to the menu 402. The menu 902 may include one or more fields 904-914 (similar to the fields 404-414) that may be capable of receiving one or more parameters, settings, or configurations, which may be received by the computing device 300 from an application, a user, the local office 103 or other entity, etc. According to some aspects, one or more of these parameters might not be used in the configuration of the security mechanism of the computing device 300. For example, as shown in FIG. 9, the field 904*b* and the field 906 might not be defined with a parameter or setting, and may be left blank. Alternatively or additionally, the fields 904*b* and 906 might not be displayed in the menu 902 if these fields have no defined setting. According to some aspects, a field, such as a second, third, or other subsequent parameter, may be added to the menu 902 (e.g., via an "Add" input button, etc.).

As shown in FIG. 9, the field 904a (P1) may be configured with a setting of "Current Temperature." Thus, the field 904 may correspond to the parameter of the current temperature, such as reported by and/or received by the computing device 300 from the weather application 353 or some other weather source. The field 908 may be configured with a setting of "Set P1 to Last Digit," which may correspond to formatting the determined value of P1 to a value equal to only the last digit of the determined value of P1. The field 910 may be configured with a setting of "Rotating Dial and OK Button," which may correspond to the type of user interface input that may be used to unlock the computing device 300. The field 912 may correspond to an input method of "Drag and Tap," which may correspond to the type of input method that may be used to unlock the computing device 300. The field 914 may correspond to a timeout value of "Every 5 minutes or after receiving new data from application," which may correspond to a timeout value of P1. Based on these settings, the computing device 300 may generate a user interface 1040 as shown in FIG. 10.

FIG. 10 illustrates a chart 1020 showing a value or result for each field of the example menu 902 as shown in FIG. 9. For example, as shown in FIG. 10, the computing device 300 may determine a value for the field 904a to be "45," as shown by element 1004a. For example, the computing device 300 may receive the information relating to current temperature form the application 352 or some other source, and may determine the current temperature and the value for the field 904a based on this information. The computing device 300 may determine a value for the field 908 to be 5 (as shown by the element 1008), based on the last digit of "45." The computing device 300 may determine a value for the field 910 to be "Rotate to 5 on Dial," as shown by the element 1010. The computing device 300 may determine a value for the field 912 to be "Drag and Tap," as shown by the element 1012. The computing device 300 may also determine a value for the field 914 to be "Every 5 minutes or when new information is received," as shown by the element 1014.

FIG. 10 also illustrates the computing device 300 in a locked state having a display 330, which may display or show the generated user interface 1040 that may be based on the above determined values. The user interface 1040 may include an input section 1050 having the objects 1001 and 1002. The object 1001 may be an image of a dial that may include the numbers 1-10 spaced in a radial fashion around the dial's perimeter. The object 1001 may also include an arrow (or some other type of indicator) that may be configured to move in a circular motion around the dial. The object 1002 may be a box or button that may have include the term "OK." The objects 1001 and 1002 may be similar to the objects 301-312 in that the objects 1001 and 1002 may be configured to receive an input via contact with a body part or other input device or in some other manner, such as disclosed herein. The computing device 300 may also display the applications 351-353.

In one example, a user wishing to unlock the computing device 300 of FIG. 10 may have knowledge of the configuration of the locking mechanism used to configure the user interface 1040. For example, the user may know that the computing device 300 may unlock after the dial may have been turned to a number equal to the last digit of the current temperature (e.g., as determined based on viewing the displayed temperature of the application 353 or in some other manner). The user may use a stylus (or finger) to contact the display 330 to drag the arrow of the object 1001 to the "5" position. The user may then use the stylus (or finger) to tap the object 1002, which may indicate the user has settled on entering 5 as an input for unlocking the device. In response to the computing device 300 receiving this correct input for attempting to unlock the computing device 300, the computing device 300 may transition to an unlocked state.

Figure 11:
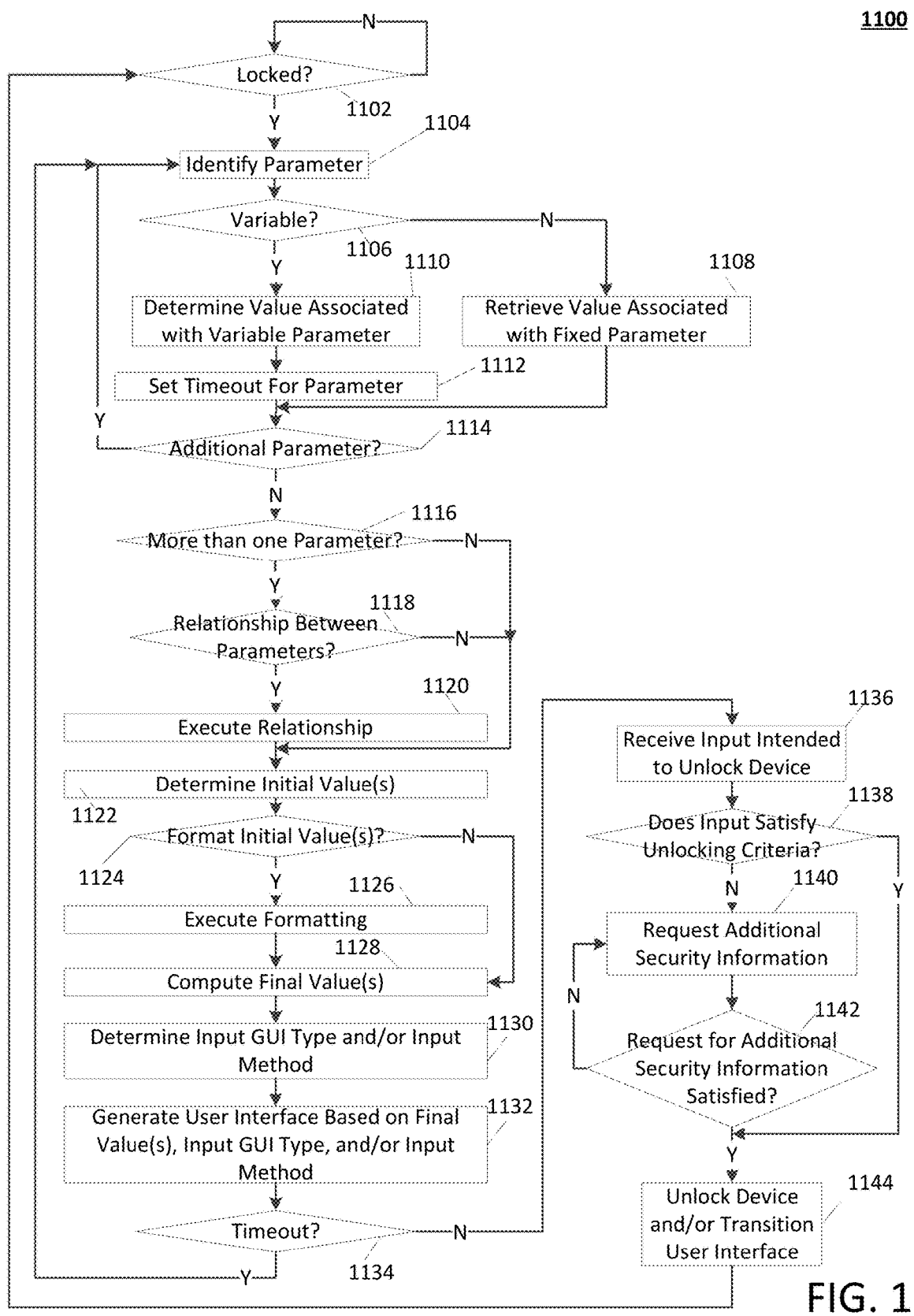
FIG. 11 illustrates an example flow diagram of a method in accordance with aspects of the present disclosure.

FIG. 11 illustrates an exemplary flow diagram illustrating an example process 1100 in accordance with one or more disclosed features described herein. FIG. 11 may illustrate an example process of the computing device 300 configuring a locking application or mechanism and a user interface, and of the computing device 300 receiving an input attempting to unlock the computing device 300. In one or more embodiments, the process illustrated in FIG. 11 and/or one or more steps thereof may be performed by one or more computing devices and/or entities (e.g., the computing device 200, the computing device 300, components of the local office 103, one or more content providers, and the like). In other embodiments, the process illustrated in FIG. 11 and/or one or more steps thereof may be embodied in computer-executable instructions that are stored in a computer-readable medium, such as a non-transitory computer-readable memory. The steps in this flow diagram need not all be performed in the order specified and some steps may be omitted and/or changed in order.

In the example provided, the process 1100 may being with step 1102, in which the computing device 300 (or other entity) may determine whether the computing device 300 may be in a locked state, thereby preventing access to the contents of the computing device 300. For example, a security application or mechanism may secure the computing device 300 in a locked state via a user interface 340. According to some aspects, an unlocked computing device 300 may automatically lock after not receiving any or user interaction for a predetermined period of time. According to some aspects, a user may manually lock the computing device 300, such as by pressing a lock or power button. If it is determined at step 1102 that the computing device 300 might not be in a locked state (e.g., unlocked), the process may return to step 1102 to determine whether the computing device 300 may be in a locked state. If it is determined at step 1102 that the computing device 300 may be in a locked state, the process may continue to step 1104.

At step 1104, the computing device 300 may identify a first parameter, such as one of the parameters 404a and 404b as shown in FIG. 4. The computing device 300 may identify the first parameter based on receiving a defined parameter, such as defined in the menu 402 of FIG. 4. According to some aspects, a parameter may correspond to any information known or retrievable/receivable by the computing device 300. For example, a user or other entity may input a parameter (e.g., "Current Battery Power Left") into the computing device 300. In another example, a user may select a parameter via a drop-down menu, or the parameter may be otherwise selectable in a pre-defined manner. According to some aspects, the settings might not be pre-defined, and may be input by a user in a non-predefined manner (e.g., via typing or entering terms). According to some aspects, the settings (such as the first parameter) may have a default setting, which may be set or received from an application, etc. The computing device 300 may receive information identifying the first parameter from an external source, such as a third party application, website, or other source. For example, weather information may be received from a weather application or weather website. According to some aspects, a parameter may correspond to a parameter and/or value being displayed by the display 330 when the device is in a locked (or unlocked) state, such as shown in FIG. 3, and as shown in FIG. 8 with the numerical values displayed on the display 330 via the applications 351-360.

At step 1106, the computing device 300 may determine whether the first parameter may be a variable parameter. A variable parameter may be a parameter whose value may be configured to change, such as change over time, periodically, randomly, change in response to some action (e.g., in response to the temperature rising, the battery power decreasing, etc.), etc. A variable parameter may also be a parameter that may be associated with a timeout value or condition (such as discussed herein and below). According to some aspects, a parameter might not be variable, but may be a fixed parameter. A fixed parameter may have a preset or pre-defined value, that might not be retrieved via an application or other source, and/or might not change over time, periodically, randomly, change in response to some action (i.e., besides a user's or other entity's action to manually change the value of the parameter). For example, the local office 103 may define on the computing device 300 a value for the fixed parameter to be a particular number or value (e.g., "13"). In another example, the user may define the value for the fixed parameter to be a particular number or value. According to some aspects, a user (or other entity) may configure, input, and/or change this parameter at any time (e.g., such as when the menu 402 is display on the display 330, via programing code, etc.).

If it is determined at step 1106 that the parameter might not be a variable parameter, the process may continue to step 1108. At step 1108, the computing device 300 may retrieve from a memory or otherwise determine the pre-defined or preset value. The process may then continue to step 1114.

If it is determined at step 1106 that the parameter may be a variable parameter, the process may continue to step 1110. At step 1110, the computing device 300 may determine a value for (or otherwise associated with) the variable parameter. For example, the computing device 300 may request and/or receive a value for the current weather, or a forecasted high temperature, or the score of a football game, and the like. This information may be received by the computing device 300 from a third-party application/entity, may be determined via an internal source, may be received by the computing device 300 from the local office 103 or other entity, and the like. According to some aspects, the computing device 300 (or other entity) may further perform one or more additional actions to determine the value for the variable parameter. For example, a variable parameter may be defined as a portion of a received number or other piece of information. For example, a variable parameter may be defined as "The last digit of the current temperature," and thus, for a current temperature of 102 degrees, a value determined for that variable parameter may be "2."

At step 1112, the computing device 300 may set or determine a timeout value for the variable parameter. According to some aspects, a timeout value for a parameter may be determined based on how frequently a value of the parameter may change, how frequently a value of the parameter may be received by the computing device 300, how frequently the computing device 300 may determine the value of the parameter, or the like. For example, a weather application may update weather conditions every 5 minutes, and therefore, a timeout value for a weather related parameter may be 5 minutes (or more). According to some aspects, a timeout value may be defined by a user or some other entity. For example, a user may configure the computing device 300 (e.g., via computer code, via the menu 402, etc.) to refresh a value of a parameter after a predetermined period of time (e.g., 15 minutes) for security reasons.

At step 1114, the computing device 300 may determine whether there may be any additional parameters to be used by the computing device 300 in generating the locking mechanism and user interface. For example, a user (or other entity) may have input or otherwise defined more than one parameter (e.g., via the fields 404a and 404b in FIG. 4) on the computing device 300, such as via the menu 402 or in some other manner (e.g., via computer code, etc.). If it is determined at step 1114 that there may be additional parameters that may be used by the computing device 300 in generating the locking mechanism and user interface, then the process may return to step 1104, where the computing device 300 may identify the additional parameter. If it is determined at step 1114 that there may be additional parameters that may be used by the computing device 300 in generating the locking mechanism and user interface, then the process may continue to step 1116.

At step 1116, the computing device 300 may determine whether more than one parameters (and their associated values) have been determined. For example, the computing device 300 may have determined a value for each of a plurality of parameters via one or more of the steps 1104-1114. If it is determined at step 1116 that the computing device 300 might not have determined a value for more than one parameter, then the process may continue to step 1122. If it is determined at step 1116 that the device may have determined a value for more than one parameter, then the process may continue to step 1118.

At step 1118, the computing device 300 may determine whether a relationship between one or more of the identified/determined parameters may have been defined. For example, a user (or other entity) may have input or otherwise defined a relationship (e.g., via field 406 in FIG. 4) on the computing device 300, such as (e.g., via the menu 402) between the values of the parameter(s) determined from the field(s) 404. The relationship may involve one or more of these parameter values. For example, the relationship may be a mathematical operation between one or more of the parameters (e.g., add, subtract, multiply, divide, exponentiation, remainder from division, fraction, negation, factorial, logarithm, square root, absolute value, trigonometric operations, etc.). For example, the relationship for two parameters P1 and P2 may be: [Remainder of (3−P1)/(P2× 2)], and the like. The relationship may be a numeric comparison, such as equality, inequality, less than, less than or equal to, greater than, or greater than or equal to. For example, the relationship for two parameters P1 and P2 may be: [Greater of (P1 or P2); If P1=P2, then P1]. The relationship may be a logical or Boolean operation (and, or, xor, xnor, not, nand, nor, etc.). For example, the relationship for two parameters P1 and P2 may be a XOR type relationship: [If P1<10 and P2<10, then 2; If P1<10 and P2>10, then 4; If P1>10 and P2<10, then 4; If P1>10 and P2>10, then 2]. According to some aspects, there may be more than one relationship defined. For example, for three parameters, P1, P2, and P3, a first relationship may be [P1+P2], and a second relationship may be [P2−P3]. In such a case, there may be two separate and/or distinct initial values determined (e.g., discussed with respect to step 1122), one initial value based on the first relationship [P1+P2], and a second initial value based on the second relationship [P2−P3].

According to some aspects, there might not be a relationship defined between the parameters. In such a case, the identified parameter values may be kept separate or otherwise not operated on by some operation or defined manner. If it is determined at step 1118 that there might not be a relationship defined between one or more of the parameters, then the process may continue to step 1122.

If it is determined at step 1118 that there may be a relationship defined between one or more of the parameters, then the process may continue to step 1120, where the identified/determined relationship(s) may be executed by the computing device 300. For example, at step 1120, two parameters P1 and P2 may have determined values of 3 and 65 (respectively), and a relationship may be defined as [Greater of (P1 or P2); If P1=P2, then P1]. Thus, at step 1120, the computing device 300 may execute this relation by comparing the values of "3" and "65" to determine the greater of these values (or whether the values are equal).

At step 1122, the computing device 300 may compute one or more initial values based on the values for each of the identified parameters. For example, the computing device 300 may determine for a single fixed or variable parameter value (e.g., for the flow arrow coming from step 1116), that the initial value for this fixed or variable parameter may equal the determined value for this fixed or variable parameter (e.g., as determined in step 1108 or step 1110).

In another example, the computing device 300 may determine for a plurality values of parameters (e.g., fixed, variable, or combination) that might not have a defined relationship (e.g., for the flow arrow coming from step 1118), that respective initial values (e.g., an initial value for each determined parameter value) may be the respective determined parameter values for each of these values (e.g., as determined in step 1108 and/or step 1110). For example, a fixed parameter P1 may have a determined value of "5" from step 1108, a variable parameter P2 may have a determined value of "8" from step 1110, and there may not be a relationship defined for these two variables (e.g., to be kept separate and/or distinct from each other). In such a case, the computing device 300, at step 1122, may determine one initial value of "5" and one initial value of "8." According to some aspects, one initial value may be composed of a plurality of separate and/or distinct values (e.g., "5" and "8").

In another example, the computing device 300 may determine one or more initial values based on the execution of a determined relationship between one or more of a plurality of parameters (e.g., steps 1118 and 1120). For example, for two parameters P1 and P2 having determined values of 3 and 65 (respectively), and a defined relationship or [Greater of (P1 or P2); If P1=P2, then P1], the computing device 300, at step 1122, the computing device 300 may determine an initial value of "65," because 65 is greater than 3.

In another example, there may be more than one relationship defined for a plurality of parameters. For example, three parameters, P1, P2, and P3 may have respective values of 3, 2, and 1, a first relationship that may be defined as [P1+P2], and a second relationship that may be defined as [P2−P3]. In such a case, the computing device 300 may determine two separate and/or distinct initial values, one initial value (e.g., "5") based on the first relationship [P1+P2], and a second initial value (e.g., "1") based on the second relationship [P2−P3].

At step 1124, the computing device 300 (or other entity) may determine whether to format one or more of the determined initial values in accordance with a defined (or otherwise known by the computing device 300) format.

According to some aspects, a user (or other entity) may have input or otherwise defined a format (e.g., via field 408 in FIG. 4) on the computing device 300, such as via the menu 402 or in some other manner (e.g., via computing code, etc.). For example, the defined format may instruct the computing device 300 on how to manipulate or otherwise change an initial value determined in step 1122. According to some aspects, the format may change an initial value to a more simple value with which the computing device 300 may use to configure the locking mechanism and user interface. If it is determined at step 1124 to not format one or more of the initial values, then the process may continue to step 1128.

If it is determined at step 1124 to format one or more of the initial values, then the process may continue to step 1126, where the formatting of the one or more initial values may be executed or otherwise carried out by the computing device 300 (or other entity). For example, the format may be defined to be "Set to 1-12," which may indicate to or instruct the computing device 300 to set an initial value to a number between 1-12. For example, the computing device 300 may compute a formatted value of "1" for an initial value of "13" based on the "Set to 1-12" format. According to some aspects, the format may be an operation or formula, such as a mathematical operation or formula. For example, the format of "Set to 1-12" may correspond to the remainder of dividing the initial value and 12. Thus, for an initial value of 39, using this mathematical statement, the computing device 300 may calculate (39/12) to be 3 with a remainder of 3. Another example of formatting may be to "Set to last digit," which may result in a formatted value equal to the last digit of an initial value. Another example of formatting may be to "Add first two digits to each other," which may result in a formatted value equal to adding the first two digits of an initial value together. For example, using this format and an initial value of 515, a formatted value may be "6," which may equal to the addition of the first two digits of 515 (e.g., 5+1). Other types of formatting are also available to be used in accordance with aspects disclosed herein.

At step 1128, the computing device 300 or other entity may compute or determine one or more final values based on the determined initial values. For example, a final value may be a formatted value, such as determined as a result of steps 1124 and/or 1126. In another example, a final value may be one or more of the determined initial values (e.g., non-formatted initial values), as determined as a result of step 1122.

At step 1130, the computing device 300 (or other entity) may determine a type of user interface to generate and/or type of user input to use in implementing a locking mechanism. According to some aspects, a user (or other entity) may have input or otherwise defined a type of user interface and/or a type of user input (e.g., via field 410 and/or field 412 in FIG. 4) on the computing device 300, such as via the menu 402 or in some other manner (e.g., via computing code, etc.). The user interface may comprise one or more interface objects, which may include selectable and/or non-selectable objects. For example, the interface objects may comprise graphical elements, such as videos, images, or text, which may be selectable or otherwise capable of interactivity, such as being selected or used to input commands (e.g., from a user). According to some aspects, the interface objects might not only comprise graphical elements, but may comprise one or more non-graphical elements, such as an interactive selectable blank portion (e.g., no image) of the user interface. In one example, a type of user interface may be defined as "6 Horizontal Slides," which may correspond to a user interface having one or more objects configured to slide in six horizontal slides. In another example, a type of user interface may be defined as "Vertical slide for a number of times, then OK," which may correspond to sliding one or more objects for a set number of times (e.g., the number of times may correspond or equal to one or more of the determined final values) and then entering "OK" to finalize the input sequence.

According to some aspects, the input method may be any type of input method, such as sliding, moving, selecting, clicking, visual, audio, motion based, etc. For example, the user interface input may comprise sliding, moving, selecting, or clicking one or more graphical or non-graphical elements or objects, such as to another location on the user interface 340 or to make a symbol on the user interface 340 (e.g., making an "X" symbol by sliding a finger (or other input device) from the top left corner to the bottom right corner of the display 330 and then sliding a finger from the top right corner to the bottom left corner of the display 330); rotating or otherwise selecting one or more graphical or non-graphical elements or objects (e.g., making a twirl, circle, etc.), rotating or otherwise selecting a graphical dial to a value or by a determined amount (e.g., rotate to a determined final value of 5 on a dial showing the numbers 1-12), or entering a set of numbers or letters.

At step 1132, the computing device 300 (or other entity) may generate, display, and/or otherwise provide (e.g., via a display) a user interface configured with a security mechanism (e.g., a locking mechanism) that may be based on any of the information determined in (and/or associated with) one or more of the steps of the process 1100. The user interface may be the same as or similar to the user interfaces discussed above (e.g., the user interface 340 as shown in FIG. 5). As described above with respect to FIG. 5, the computing device 300 may generate the user interface 340 and an associated security mechanism based on one or more final values (e.g., step 1128), the type of user interface (e.g., step 1130), and the type of input method (e.g., step 1130). For example, if the computing device 300 determines a final value to be 5, the type of user interface to be 6 slides with 12 dots, and the type of input method to be slide or swipe, then the device may generate a user interface that may appear similar to the user interface 340 of FIG. 5. The computing device 300 (e.g., based on the final value of 5) may then assign or configure the 5$^{th}$ dot (e.g., object 305 shown in FIG. 5) as a correct object that, when input in the defined manner of slide or swipe, may be configured to unlock the computing device 300. The computing device 300 might not assign any of the other objects 301-304 and 306-312 to be a correct object that may be configured to unlock the computing device 300.

In another example, using the same information as the previous example, but changing the type of user interface to be making an "X" with an input device on the user interface for a number of times equal to the final value, the computing device 300 may generate a user interface that may display or otherwise show a blank screen, but may have non-visible objects capable of receiving an input. Thus, to unlock such a computing device 300, a user may have to use a finger to make an "X" on the blank portion of the screen (e.g., detectable via the non-visible objects) a total of 5 times (e.g., the final value) to unlock the computing device 300.

According to some aspects, the computing device 300 may generate a user interface based on a plurality of final values. For example, the computing device 300 may determine final values of "3" and "2", the type of user interface to be "Blank for first value and 6 Slides for second value", and the type of input method to be tap, slide, or swipe. Based on this information, the computing device 300 may generate a user interface that may contain an input portion that contains a blank portion that may have one or more non-visible selectable objects and a portion containing 6 slides. Thus, to unlock such a device, a user may have to tap one of the non-visible objects a total of 3 times (e.g., based on the final value of 3), and then may have to slide the second slide out of the 6 slides (e.g., based on the final value of 2).

At step 1134, the computing device 300 may determine whether a timeout condition for one or more of the determined parameters may have been satisfied. For example, the computing device 300 may have determined one or more timeout conditions at step 1112 or may otherwise know one or more timeout conditions for any of the determined parameters. For example, a weather application may update weather conditions every 5 minutes, and therefore, a timeout value for a weather related parameter may be 5 minutes (or more). Accordingly, a timeout condition for this parameter may be satisfied after the computing device 300 determines that 5 minutes have elapsed since the device determined (e.g., received from a weather application) the value for the weather related parameter. According to some aspects, the timeout condition may be manually triggered (e.g., by a user or other entity such as the local office 103 or application). For example, the local office 103 may transmit a message/instruction to the computing device 300 to timeout a value of a parameter. In another example, a weather application may instruct the computing device 300 to timeout a value of an associated parameter. If the computing device 300 determines that a timeout condition for one or more of the determined parameters may have been satisfied, then the process may return to step 1104. If the computing device 300 determines that a timeout condition for one or more of the determined parameters might not have been satisfied, then the process may continue to step 1136.

At step 1136, the computing device 300 (e.g., via the user interface configured with the security mechanism) may receive an input for unlocking the computing device 300. For example, the user interface may receive input as user contact (e.g., via a finger, etc.), input from an input device (e.g., mouse, stylus, etc.), other sensory input (e.g., via movement, such as eye or hand movement, audio or voice input, etc.), and the like. The user interface may receive this input via one or more objects, such as the objects 301-312 shown in FIG. 5.

At step 1138, the device may determine whether the received input (e.g., from step 1136) satisfies the parameters or configurations (e.g., the requirements) of the security mechanism (e.g., via a computing script, etc.). According to some aspects, the computing device 300 may determine whether the received input may correspond to the determined values and/or information used to configure the user interface and/or security mechanism. For example, the computing device 300 may determine final values of "3" and "2", the type of user interface to be "Blank for first value and 6 Slides for second value", and the type of input method to be tap, slide, or swipe. Based on this information, the computing device 300 may generate a user interface that may contain an input portion that contains a blank portion that may have one or more non-visible selectable objects and a portion containing 6 slides. Thus, to unlock such a device, a user may have to tap one of the non-visible objects a total of 3 times (e.g., based on the final value of 3), and then may have to slide the second slide out of the 6 slides (e.g., based on the final value of 2). Thus, an input comprising of a user tapping one of the non-visible objects 3 times, and then sliding the second slide may be a correct input and may satisfy the requirements of the security mechanism. If the computing device 300 determines that the received input may satisfy the security mechanism, then the process may continue to step 1144. If the computing device 300 determines that the received input might not satisfy the security mechanism, then the process may continue to step 1140.

At step 1140, the computing device 300 may request additional security information (e.g., via a security mechanism). An example of additional security information may be shown in FIG. 6B and described in the related sections of the disclosure. For example, the computing device 300 may display a user interface that may request some additional information, such as a PIN number or other security challenge. According to some aspects, the computing device 300 may display a user interface configured in the same or similar manner as generated in step 1132 with a second set of parameters, which may include one or more of the parameters used to generate the user interface generated at step 1132.

At step 1142, the computing device 300 may determine whether any received or input additional security may satisfy the request for additional security information. If the computing device 300 determines that the additional security information might not satisfy the request for additional security information, the process may return to step 1140, in which the computing device 300 may request even more security information. According to some aspects, after an unsuccessful attempt to enter this security information, the computing device 300 may enter into a locked-out state, such as described above with respect to FIGS. 6A and 6B. The locked-out state may require the first user to perform some addition action, such as contacting a service provider or other entity, require the computing device 300 to wait for a period of time (e.g., 30 minutes, etc.) before allowing another attempt to unlock the computing device 300, or otherwise make the contents of the device inaccessible (e.g., via encryption, etc.). According to some aspects, the computing device 300 may be restarted, may be put in a sleep or stand-by mode, may be powered off, may have a battery removed, or the like (e.g., via a user action, command, or button sequence). In such situations, the computing device 300 still might not have received satisfactory additional security information, and the process may return to step 1140, where the computing device 300 may request additional security information (e.g., the computing device 300 may still require the additional security information in response to receiving unsatisfactory unlocking criteria at 1138).

If the computing device 300 determines that the additional security information may satisfy the request for additional security information, the process may continue to step 1144.

At step 1144, the computing device 300 may be unlocked (or the computing device 300 and/or user interface may be transitioned to another state), and the contents of the computing device 300 may be accessible. According to some aspects, at step 1144, the computing device 300 may further require additional security information or additional action, even after being unlocked. The process may then return to step 1102, in which the computing device 300 may determine whether the device may be in a locked state. According to some aspects, the process 1100 may end after any step.

Although example embodiments are described above, the various features and steps may be combined, divided, omitted, rearranged, revised and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

The invention claimed is:

1. A non-transitory computer-readable medium comprising instructions that, when executed, cause a computing device to:
    present, to a first user, a first numerical value on a lock screen, wherein the first numerical value comprises a variable parameter that changes while presented on the lock screen;
    receive a first input via the lock screen; and
    transition the lock screen to an unlocked screen based on a determination that the first input corresponds to the first numerical value presented on the lock screen.

2. The non-transitory computer-readable medium of claim 1, wherein the first numerical value is based on at least one of:
    a current battery life of the computing device;
    weather-related information;
    a stock quote;
    a quantity of emails;
    meeting information;
    fitness information;
    a temperature;
    a time;
    a date; or
    a score from a sporting event.

3. The non-transitory computer-readable medium of claim 1, wherein the first numerical value is received from a third party.

4. The non-transitory computer-readable medium of claim 1, wherein the first numerical value is determined based on a source internal to the computing device.

5. The non-transitory computer-readable medium of claim 1, wherein the first numerical value is defined by the first user.

6. The non-transitory computer-readable medium of claim 1, wherein receiving the first input comprises receiving at least one of: a slide input, a tap input, a rotational input, a typing input, a touch input, a click input, an audible input, a drag input, or an optical input.

7. The non-transitory computer-readable medium of claim 1, wherein the instructions, when executed, cause the computing device to:
    determine a timeout condition for the first numerical value, wherein transitioning the lock screen to the unlocked screen occurs before the timeout condition expires.

8. The non-transitory computer-readable medium of claim 7, wherein the timeout condition is based on how frequently the first numerical value changes.

9. The non-transitory computer-readable medium of claim 1, wherein the first input is a gesture input.

10. The non-transitory computer-readable medium of claim 1, wherein the instructions, when executed, cause the computing device to:
    present, via the lock screen and after receiving the first input, a prompt for a second input;
    receive the second input; and
    transition the lock screen to the unlocked screen based on the second input corresponding to security information and the first input corresponding to the first numerical value displayed on the lock screen.

11. The non-transitory computer-readable medium of claim 10, wherein the second input comprises a PIN number.

12. The non-transitory computer-readable medium of claim 1, wherein the computing device comprises a mobile device.

13. A non-transitory computer-readable medium comprising instructions that, when executed, cause a computing device to:

present, to a first user, a lock screen;

receive a first input via the lock screen; and unlock the computing device based on a determination that the first input corresponds to a first numerical value, wherein the first numerical value varies based on information displayed via the lock screen.

14. The non-transitory computer-readable medium of claim 13, wherein the instructions, when executed, cause the computing device to derive the first numerical value based on:

a first variable parameter displayed on the lock screen, wherein the first variable parameter changes while displayed on the lock screen; and a second fixed parameter.

15. The non-transitory computer-readable medium of claim 13, wherein the first numerical value expires after a predetermined amount of time.

16. The non-transitory computer-readable medium of claim 13, wherein the first numerical value is displayed adjacent to an input interface.

17. The non-transitory computer-readable medium of claim 13, wherein the first numerical value is based on fitness information.

* * * * *